(12) United States Patent
Pruitt et al.

(10) Patent No.: US 10,046,494 B2
(45) Date of Patent: Aug. 14, 2018

(54) SMALL FORMAT REACTION INJECTION MOLDING MACHINES AND COMPONENTS FOR USE THEREIN

(71) Applicant: BetaJet, LLC, Athens, GA (US)

(72) Inventors: Joseph W. Pruitt, Athens, GA (US); Jerry V. Foster, Valdosta, GA (US); Jonathan E. Schweiger, Mt. Crested Butte, CO (US); Christopher Statham, Atlanta, GA (US); Michael D. Field, Snellville, GA (US)

(73) Assignee: BETAJET, LLC, Athens, GA (US)

( * ) Notice: Subject to any disclaimer, the term of this patent is extended or adjusted under 35 U.S.C. 154(b) by 0 days.

(21) Appl. No.: 15/671,810

(22) Filed: Aug. 8, 2017

(65) Prior Publication Data

US 2018/0065286 A1     Mar. 8, 2018

Related U.S. Application Data

(60) Provisional application No. 62/384,237, filed on Sep. 7, 2016.

(51) Int. Cl.
    *B29C 45/26*     (2006.01)
    *B33Y 80/00*     (2015.01)
    (Continued)

(52) U.S. Cl.
    CPC ...... *B29C 45/2673* (2013.01); *B29C 33/3842* (2013.01); *B29C 45/0084* (2013.01); *B29C 45/1866* (2013.01); *B29C 45/20* (2013.01); *B29C 45/2725* (2013.01); *B29C 45/76* (2013.01); *B33Y 80/00* (2014.12); *G06K 19/0723* (2013.01); *B29C 2945/76173* (2013.01); *B29C 2945/76287* (2013.01); *B29C 2945/76354* (2013.01); *B29C 2945/76488* (2013.01); *B29K 2075/00* (2013.01); *B29K 2105/0002* (2013.01)

(58) Field of Classification Search
    CPC ............. B29C 67/246; B29C 45/0084; B29C 45/2673; B29C 45/2602; B29C 45/2675
    See application file for complete search history.

(56) References Cited

U.S. PATENT DOCUMENTS 3,473,102 A    10/1969   Williams
3,912,234 A    10/1975   Peter
(Continued)

FOREIGN PATENT DOCUMENTS

| CA | 2599532 | | 10/2006 | |
|---|---|---|---|---|
| CA | 2599532 A1 | * | 10/2006 | ............. B29C 45/26 |
| GB | 2174035 | * | 10/1986 | |

OTHER PUBLICATIONS

PCT Patent Application PCT/US17/50495 filed Sep. 7, 2017, International Search Report and Written Opinion dated Nov. 20, 2017.

*Primary Examiner* — Jill L Heitbrink
(74) *Attorney, Agent, or Firm* — Thomas | Horstemeyer, LLP

(57) ABSTRACT

The present disclosure relates to machines and methods for reaction injection molding. In particular, the present disclosure provides small format reaction injection molding machines having exchangeable molds and reactant material tanks, as well as molds configured for use therein and associated componentry.

21 Claims, 14 Drawing Sheets

(51) Int. Cl.
*B29C 33/38* (2006.01)
*B29C 45/00* (2006.01)
*B29C 45/18* (2006.01)
*B29C 45/20* (2006.01)
*B29C 45/27* (2006.01)
*B29C 45/76* (2006.01)
*G06K 19/07* (2006.01)
*B29K 75/00* (2006.01)
*B29K 105/00* (2006.01)

(56) References Cited

U.S. PATENT DOCUMENTS

| | | | |
|---|---|---|---|
| 4,056,122 | A | 11/1977 | Schlieckmann et al. |
| 4,189,070 | A * | 2/1980 | Macosko .............. B01F 5/0256 222/134 |
| 4,400,340 | A | 8/1983 | Klosiewicz |
| 4,473,531 | A | 9/1984 | Macosko et al. |
| 4,826,885 | A | 5/1989 | Tsai |
| 5,049,062 | A | 9/1991 | Gellert |
| 5,773,050 | A | 6/1998 | Wohlrab |
| 5,775,402 | A * | 7/1998 | Sachs .................. B22C 9/065 164/4.1 |
| 6,187,247 | B1 | 2/2001 | Buzzell et al. |
| 2007/0063378 | A1 | 3/2007 | O'Donoghue et al. |
| 2007/0182562 | A1 | 8/2007 | Abbott et al. |
| 2008/0179251 | A1 | 7/2008 | Davison et al. |
| 2011/0115117 | A1 | 5/2011 | Desmith et al. |

* cited by examiner

SMALL FORMAT REACTION INJECTION MOLDING MACHINES AND COMPONENTS FOR USE THEREIN

CROSS REFERENCE TO RELATED APPLICATIONS

This application claims priority to, and the benefit of, U.S. provisional application entitled "Small Format Reaction Injection Molding Machines and Components for Use Therein" having Ser. No. 62/384,237, filed Sep. 7, 2016, which is hereby incorporated by reference in its entirety.

FIELD OF THE INVENTION

The present disclosure relates to machines and methods for reaction injection molding. In particular, the present disclosure provides small format reaction injection molding machines having exchangeable molds and reactant material tanks, as well as molds configured for use therein and associated componentry.

BACKGROUND

Traditionally, fabrication of plastic parts and pieces has been expensive and time intensive due to the need to design and fabricate molds, as well as the limited accessibility of plastic fabrication equipment to the small scale manufacturer or those seeking to generate prototypes prior to large scale manufacture. In recent years, molding processes have benefited from advancements in computer aided design ("CAD") and computer aided manufacturing ("CAM") techniques, which has reduced costs associated with mold design, as well as reducing the time needed to generate high quality molds. Such computerized mold design does allow parts to be designed with higher probability that the plastic parts intended for fabrication therein will be both functional and can be manufactured. However, the parts themselves must still be fabricated in commercial manufacturing facilities, which require large upfront investment and are typically used as outsourced production resources for many parts and products manufacturers. In order to recoup the cost of the production facility, the manufacturer must typically add significant cost to the fabricated plastic part cost, which often can make smaller runs of parts cost prohibitive or, in the alternative, will increase the final product in which the fabricated plastic part will be incorporated. Moreover, it is generally not feasible to use such facilities for the fabrication of prototype parts due the cost and uncertainties associated therewith.

Additive manufacturing, which may be more commonly known today in the context of "3D Printing," allows plastic parts to be made on a small scale by melting thermoplastic material and adding it layer by layer according to the specifications in a CAD drawing. 3D printing has the benefit of eliminating the need for mold creation and, accordingly, this methodology lends itself well to the fabrication of plastic parts on a scale that provides access to a wide variety of users. Indeed, 3D printing has substantially transformed the prototyping process in recent years, making it much easier to generate plastic parts to test their form and function on a small scale.

3D printing is nonetheless a very time consuming process, and therefore does not generally lend itself to use when more than a few pieces or parts are needed. For example, when small format 3D printers are used, it can take one hour or more to make a single part or piece using conventional processes. While commercial 3D printers are available to provide faster fabrication, such devices are expensive and, as such, are not readily available for general use. Thus, users today must trade off speed for cost and accessibility. This means that widely available 3D printers are generally used for rapid prototyping, especially prior to or in conjunction with mold design. Once the prototype configuration is finalized for manufacture, the CAD information is then used to prepare the mold for manufacture of the piece or part using conventional injection molding processes.

The proliferation of 3D printers in recent years, while important to allow the product design and prototyping processes to be substantially streamlined, still does not address the need to generate multiple finished pieces and parts in a short period of time using devices that are readily available to and more easily deployable by users.

Reaction injection molding is commonly used to fabricate pieces and parts where flexibility, softness and/or pliability is needed. Harder or foamed parts are also obtainable depending on the reactants used in a process. In a reaction injection molding process, two liquid components—"part A", for example, a formulated polymeric isocyanate catalyst, and "part B", for example, a formulated polyol blend, are mixed in a pressurized head and then pumped into a mold cavity. A reaction then occurs in the mold, resulting in a formed polymer part. Since these liquid or liquid-like materials require less pressure than other plastic fabrication methodologies, they can be injected into cost-efficient aluminum molds, lowering tooling costs. Additionally, such molding processes do not generally require substantial cooling of the molds. A further benefit is that the reactant materials can be varied to allow a myriad of physical properties to be imparted to the finished part. However, currently, reaction injection molding manufacturing processes are conducted on an industrial/commercial scale with catalyst and reactant stored in large storage tanks and dispensed by large, high-pressure industrial pumps.

The overall cost and complexity of existing reaction injection molding processes means that pieces and parts must generally be sent off-site for fabrication after the prototyping phase is complete, thus increasing the time and cost of part and piece fabrication. In short, notwithstanding the benefits of reaction injection molding processes in generating plastic parts for use in many products, this methodology is generally not accessible outside of commercial manufacturing facilities.

Moreover, commercial production of plastic pieces and parts often require only fairly small runs of from 1 to about 5000 pieces. When existing fabrication processes are used (i.e., mold fabrication followed by use of industrial scale plastic production facilities), runs of such a small size are expensive given the large purchase and operational costs associated with commercial reaction injection molding processes. Such background costs will necessarily cause the cost and manufacturing complexity of the final product that incorporates the piece or part to often be greatly magnified. Further, in many processes, manufacturing agility is needed. Early stage product production prior to moving to large scale production often requires evaluation of minor changes to the product to test various aspects of the product both in manufacturing and in use. Typically, the tooling costs associated with evaluating a minor variation in part and/or mold design has been an impediment to those making smaller run and/or lower cost molded products.

The movement toward "mass customization" in the marketplace also demonstrates a need for manufacturing agility. Runs of medical devices may need to be varied by size (e.g, small, medium or large) or customization of a lot of products for a particular patient may be required. Using traditional reaction injection molding processes, such flexibility is typically too expensive for all but the most expensive and/or highest volume products.

There remains a need for greater accessibility of users to reaction injection molding processes for fabrication of pieces and parts for use as finished products or as components in another product, especially where small production runs are contemplated. Moreover, there remains a need for users to be able to switch out reactant materials and molds on a smaller scale to allow flexibility in the ability to make pieces and parts having varied properties.

SUMMARY

The present invention relates to machines and methods for reaction injection molding. In particular, the present invention provides small format reaction injection molding machines having exchangeable molds and reactant material tanks, as well as molds configured for use therein and associated componentry.

In one aspect, among others, a reaction injection molding machine can comprise a housing comprising an interior portion and exterior portion; at least one reactant materials tank engagement station in operational engagement with a first reactant material tank comprising part A of an injection molding process and a second reactant material tank comprising part B of the injection molding process, wherein the first and second reactant materials tanks are each, independently, configured to sealingly engage with a corresponding engagement port in operational communication with the at least one reactant materials tank engagement station, thereby providing a first reactant material fluid stream and a second reactant material fluid stream, wherein each of the first and second reactant materials tanks are configured to hold up to about three gallons each of reactant material, and wherein the first and second reactant material tanks are sized to fit substantially within at least some of the housing of the reaction injection molding machine; a molding support framework comprising a first mold support plate and a second mold support plate, wherein: (i) the first and second mold support plates are in respective operational engagement with first and second mold engagement plates; and the first mold engagement plate is configured to securably engage with a first mold part, and (ii) the second mold engagement plate is configured to securably engage with a second mold part to provide an assembled mold suitable for injection molding when the first and second mold parts are sealingly engaged; an injection molding manifold in operational engagement with each of the first and second reactant material fluid streams; and an injection molding nozzle engagement station configurable for operational engagement of a proximal end of a mixing nozzle with the injection molding manifold and a distal end of the mixing nozzle with the assembled mold.

In one or more aspects, the reaction injection molding machine can be configured to apply a pressure to the assembled mold during the injection molding process that does not exceed about 500 psi. The first and second reactant materials tanks can each, independently, comprise a reactant material to generate at least one thermoset plastic article or part from the injection molding process. In various aspects, the reaction injection molding machine can comprise a spring release assembly configured to apply force to the first mold engagement plate opposite the first mold part. The applied force can facilitate disengagement of the distal end of the mixing nozzle from the assembled mold. The spring release assembly can comprise a plurality of springs operationally engaged with the first mold engagement plate and the first mold support plate. The mixing nozzle can extend through the first mold engagement plate and the first mold support plate for operational engagement of the distal end of the mixing nozzle with the assembled mold.

In one or more aspects, the molding support framework can be configured to move the second mold engagement plate to clamp the second mold part against the first mold part, thereby forming the assembled mold. The molding support framework can comprise a linear drive system configured to move the second mold engagement plate to clamp the second mold part against the first mold part. The linear drive system can comprise a plurality of motor driven lead screws supported between the first and second mold support plates, the plurality of lead screws in threaded engagement with the second mold engagement plate. In various aspects, the at least one reactant materials tank engagement station can comprise a pump configured to provide at least the first reactant material fluid stream to the injection molding manifold. At least one mold part of the first and second mold parts can incorporate a mold identification that is transmittable to an identification signal receiver associated with the reaction injection molding machine. The mold identification can comprise a radio-frequency identification (RFID) tag incorporated into the at least one mold part, the RFID tag configured to transmit an identification signal associated with the mold identification for the at least one mold part.

In one or more aspects, the first and second reactant material tanks can incorporate tank identifications that are transmittable to an identification signal receiver associated with the reaction injection molding machine. The tank identifications can comprise radio-frequency identification (RFID) tags incorporated into the first and second reactant material tanks. The RFID tags can be configured to transmit an identification signal associated with the tank identification, the tank identification corresponding to the reactant material in that reactant material tank. Provision of the first reactant material fluid stream and the second reactant material fluid stream can be restricted until the tank identifications have been verified by the reaction injection molding machine. In various aspects, the corresponding engagement ports can comprise a check valve configured to provide a substantially leak proof seal between the first or second reactant materials tank engaged with that engagement port and the at least one reactant materials tank engagement station. A spring loaded latch mechanism can securely engage the first or second reactant materials tank with the corresponding engagement port.

In one or more aspects, the first and second reactant material tanks can comprise a fill level indicator configured to provide an indication of reactant material in that reactant material tank. The fill level indicator can comprise a magnetic float incorporated into that reactant material tank. In various aspects, the part A can be a catalyst material and the part B can be a polyurethane reactant material or a coreactive silicon or epoxy material. The catalyst material can be a formulated polymeric isocyanate catalyst and the polyurethane reactant material can be a formulated polyol blend. In some aspects, the first and second mold parts can be generated using a 3D printing process. The at least one reactant materials tank engagement station can comprise a key-way for each corresponding engagement port. The key-way can comprise features configured to align with corresponding features of either the first or second reactant materials tank containing the appropriate first or second reactant material for that engagement port.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
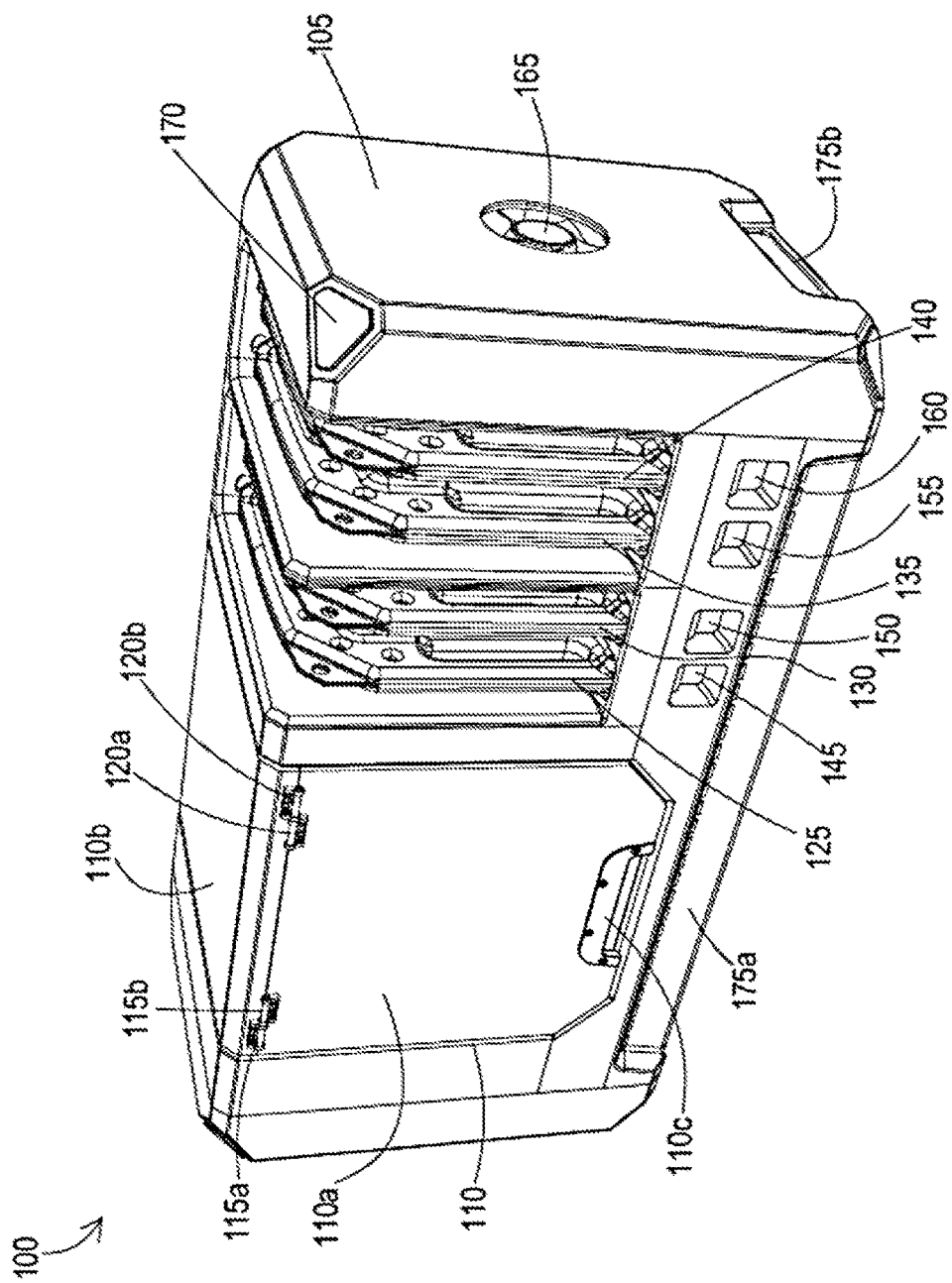
FIGS. 1 through 3 provide various perspective views of an example of a reaction injection molding machine, in accordance with various aspects of the present disclosure.

In the following detailed description, reference is made to the accompanying drawings, which form a part hereof, and within which are shown by way of illustration certain embodiments by which the subject matter of this disclosure may be practiced. It is to be understood that other embodiments may be utilized and structural changes may be made without departing from the scope of the disclosure. In other words, illustrative embodiments and aspects are described below. But it will of course be appreciated that in the development of any such actual embodiment, numerous implementation-specific decisions must be made to achieve the developers' specific goals, such as compliance with system-related and business-related constraints, which may vary from one implementation to another. Moreover, it will be appreciated that such development effort might be complex and time-consuming, but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common patent law definition of "comprising" and is therefore interpreted to be an open term meaning "at least the following" and is also interpreted not to exclude additional features, limitations, aspects, etc.

The term "about" is meant to account for variations due to experimental error. All measurements or numbers are implicitly understood to be modified by the word about, even if the measurement or number is not explicitly modified by the word about.

The term "substantially" (or alternatively "effectively") is meant to permit deviations from the descriptive term that do not negatively impact the intended purpose. Descriptive terms are implicitly understood to be modified by the word substantially, even if the term is not explicitly modified by the word "substantially."

As used herein, "reaction injection molding" is a process in which two reactive liquid components are metered, blended together, and injected into a closed mold at a low or substantially low pressure. As would be recognized, the reaction injection molding process works by combining two liquid components that chemically react in a closed mold to form a thermoset plastic part.

Unlike thermoplastic injection processes that require very high temperatures and pressures to melt and force plastic into a steel tool, reaction injection molding requires significantly less energy and minimal injection force. Instead, under suitable conditions, the liquids undergo an exothermic, or heat generating, chemical reaction and polymerize inside the mold to form a cross-linked polymeric structure. Articles or parts comprised of thermoset materials are not meltable upon heating at a level that would cause thermoplastic materials to begin flowing; instead, they will degrade.

"Thermosetting resins" are prepolymers in a solid soft or viscous liquid state that changes irreversibly into an infusible, insoluble polymer network by curing. Thermosetting resins used in the machines and methods herein are those that comprise at least a "part A" and a "part B" such that when combined in the reaction injection molding machines herein will undergo curing in an assembled mold to generate a and article or part.

Accordingly, the articles or parts fabricated using the systems and methods of the present disclosure comprise thermoset materials. Yet further, the articles or parts fabricated using the systems and methods of the present disclosure consist essentially of thermoset materials. Still further, the articles or parts fabricated from the systems and methods of the present disclosure substantially do not comprise thermoplastic materials.

Reactant materials suitable for use in the reaction injection molding machine of the present disclosure, as well for use to prepare the disclosed reactant material tanks, can comprise a polyurethane catalyst (e.g, an isocyanate) and a polyurethane reactant material (e.g., a polyol), as well as other suitable materials as discussed hereinafter. Polyols used in the present disclosure can be polyether polyols, which are made by the reaction of epoxides with an active hydrogen containing compounds. Polyester polyols used in the present disclosure can be generally prepared by the polycondensation of multifunctional carboxylic acids and polyhydroxyl compounds, as discussed further herein. Additional materials that can be used in the reaction injection molding machine and the reactant material tanks of the present disclosure can include epoxy and/or silicone reactants, as discussed further herein.

By convention, the catalyst aspect of the reactant materials is "part A," and the polymeric reactant material/polyol/epoxy aspect is "part B." That convention will be followed in the disclosure herein.

"Small format" is used herein to mean a reaction injection molding machine that is configured to fit on a benchtop, a desktop, a countertop, a tabletop or the like. In this regard, the reaction injection molding machine can have dimensions of up to about 80 inches in length by 36 inches in width by 48 inches in height, or in the range of about 36 inches in length by 20 inches in width and about 24 inches in height. When the reaction injection molding machine includes reactant material tanks suitably engaged within the machine (as discussed elsewhere herein), the reaction injection molding machine is configured to incorporate a total of from about 4 to about 12 gallons of reactant materials, where such materials are loaded from a plurality of tanks as set out elsewhere herein.

In this regard, the reaction injection molding machine is configured to incorporate at least two reactant material tanks—that is a first reactant material tank and a second reactant material tank—wherein each of the tanks, independently, are charged with reactant materials appropriate to fabricate the part in need of fabricating. In some aspects, the reaction injection molding machine can incorporate at least two or more reactant material tanks, with the specific reactant material arrangement in the machine being variable, and in association with the configuration of the reactant materials engagement station as discussed herein.

As would be recognized, the reaction injection molding machine can be configured with suitable operational components (e.g., pumps, hosing etc.) to allow incorporation of the auxiliary materials. Additionally, control or processing circuitry associated with the reaction injection molding machine can allow management of auxiliary material addition.

A wide variety of part sizes can be fabricated in a reaction injection molding machine of the present disclosure, where the part size is determined substantially by the mold configuration used in each molding operation. In some aspects, the disclosed molding technology can be used to generate parts having dimensions of up to about 16 inches by 16 inches by about 7 inches. Parts can be fabricated in a wide variety of sizes below the largest part size for which the reaction injection molding machine is configurable. As would be recognized, the part size is generally defined by the size of the molds used in the reaction injection molding machine. In this regard, parts as small as 0.10 inch by 0.10 inch by 0.05 inch can be fabricated therein.

Reaction injection molding machines of the present disclosure are suitable for the fabrication of production runs that would otherwise generally not be cost effective to generate in standard injection molding operations. To this end, the disclosed technology is suitable for use to fabricate from about 25 to about 25000 pieces or parts in a single run. Yet further, the presented technology is suitable for the fabrication of from about 25, 50, 100, 500, 1000, 2500 or 5000 or more pieces or parts, where any value can form an upper or a lower endpoint, as appropriate.

Shot size, that is the volume of parts A and B used in a reaction injection molding process, can vary widely within the parameters of the small format machine of the present disclosure. The shot size for use in the reaction injection molding machines of the present disclosure can range from about 0.1 ounce to about 1 gallon. The shot size will influence the number of parts that can be made from each fully charge reactant materials tank, as would be recognized, with smaller parts allowing more parts to be made between tank changes and vice versa. In this regard, the fabricated part may be at the high end of the size range of the machine (e.g., 16×16×7 inches) and have a thin wall, or may be a small part (e.g., 0.1×0.1×0.1 inches) can incorporate a relatively large volume of material used to fabricate each part, such as when the part is substantially solid.

When the reaction parts A and B used in the reaction injection molding machine are a catalyst and a polyol, respectively, a wide variety of urethane components can be used as the polyol in the preparation of fabricated parts from the reaction injection molding machine and in the tanks configured with the reactant materials for use in the disclosed reaction injection molding machine. Broadly, both elastomeric and/or flexible polyols and their associated suitable urethane catalysts can be utilized, wherein the fabricated part can comprise a substantially rigid high modulus impact-resistant material down to a substantially soft and/or flexible rubber-like material. Yet further, the fabricated part can comprise a substantially rigid material having a flexural modulus and hardness comparable to that of a glass-like material.

The reaction injection molding machine can be configured to provide fabricated parts that comprise solid polyurethane, for example, parts that comprise substantially homogeneous flexible or rigid plastic.

Still further the reaction injection molding machine can be configured to provide fabricated parts that are foamed polyurethane and, as such, the reactant material tanks can incorporate such polyols and their associated suitable catalysts. As would be recognized, foamed polyurethanes comprise blowing agents to form a sandwich of high-density rugged skin and a lower density cellular core, or the material can be "self-skinning" in which the fabricated part will form a durable skin upon polymerization. The system rigidity and cell size can be varied to provide suitable properties as required for the fabricated part. In this aspect, the molds used in the disclosed technology can be vented to impart air flow into the mold, and an associated blowing or vacuum apparatus can be incorporated in an interior of the reaction injection molding machine housing. The venting allows air inside the mold cavity to escape when the mold is filled with resin. If the air could not vent out of the cavity, then the trapped air can create bubbles or voids in the parts. The vents can be very thin channels (e.g., 0.001" deep) going from the cavity to the outside world, and can be machined into the parting line of the molding parts. For example, the vent can be an open channel that, when the molds come together, allows air to leave through this channel at the parting line of the assembled mold).

Reactant materials tanks comprising the polyol can comprise a single type of polyol material to be supplied to the mold along with a suitable isocyanate. Yet further, properties of the finished parts can be varied by blending various polyols in a single reactant material—that is, the polyol containing reactant material tank—where that polyol blend is fed to the mold along with the suitable catalyst material. Alternatively, a plurality of polyol-containing reactant material tanks and/or auxiliary materials tanks can be engaged with the reaction injection molding machine as discussed further herein, and various amounts of each different polyol can be fed to the mold along with associated suitable catalysts as directed by the control or processing circuitry that provide the part fabrication instructions. Similarly, when reactive silicones or epoxies are used with the associated catalysts, different reactant tanks can be incorporated into the reaction injection molding machine so as to vary the final properties of the fabricated part.

Yet further, reactive silicones can be used in conjunction with associated catalyst materials. In this regard, part A can comprise a catalyst material, and part B can comprise the coreactive silicone material. When incorporated into the mold, the mixture of parts A and B will generate a thermoset reaction.

Epoxy materials and their associated catalysts can also be used to fabricate parts in the reaction injection molding machine of the present disclosure, as well as stored in the reactant material tanks configured for use in the machines herein. In this regard, the epoxy-type catalysts can comprise polyfunctional amines, acids (and acid anhydrides), phenols, alcohols and thiols. As would be recognized, epoxy reactant materials are low molecular weight prepolymers or higher molecular weight polymers which normally contain at least two epoxide groups.

The reaction injection molding machine of the present disclosure is configurable to allow fabrication of a wide variety of parts and pieces. In not limiting examples, the small format reaction injection molding machine can be used to fabricate medical device products, industrial parts (e.g., caster wheels, body panels, housings, mechanical components, consumer goods, electronics housings, etc.).

In yet further aspects, the reaction injection molding machine can be configurable to provide composite systems that can provide fabricated parts that are foam or solid, rigid or elastomeric, but that also include fiber reinforcements, such as glass or other reinforcing fibers, to enhance the structural properties of the molded part. Stiffness and impact strength can be enhanced by adding reinforcement in the material stream (e.g., reinforced reaction injection molding—R reaction injection molding) or by using a molded preform in the mold that is encapsulated (e.g., structural reaction injection molding—S reaction injection molding).

Additionally, the reaction injection molding machine can be configurable for one or more additional ports or inputs, where such additional ports or inputs are for auxiliary materials, such as accelerators (to decrease reaction time), UV hardeners (to increase resistance to UV light), and/or colorants (for custom color blending). These one or more additional ports or inputs can be incorporated within the reaction injection molding machine housing, for example, in the engagement station (as described hereinafter), whereby the reaction injection molding machine can further incorporate a fluid stream configured to deliver that auxiliary material to the mixing nozzle along with the part A and part B components. For example, auxiliary material tanks can be engaged with ports inside the reaction injection molding machine. Alternatively, the reaction injection molding machine can be configured to allow engagement of external tanks or containers that can allow the auxiliary materials to be added for delivery to the mixing nozzle as appropriate in a particular molding operation. For example, one or more external tanks comprising auxiliary materials can be operably engageable with the reaction injection molding machine through input connections or other fluid communication aspects to allow incorporation thereof into a molding operation.

The reaction injection molding machine of the present disclosure comprises a housing, wherein the housing comprises an interior portion and an exterior portion. Access is enabled into the interior of the housing via a door. These and other aspects of the disclosed technology are described in more detail hereinafter. The housing can be fabricated from a plastic material or a composite material, metal (e.g., steel, aluminum), fiberglass (e.g., fiberglass reinforced plastic or FRP), or such as pressed wood board (e.g., medium-density fiberboard or MDF). In some aspects, the housing can be constructed from two different materials, for example, the housing can be partially comprised of plastic and metal. Yet further, the housing material can be comprised of two types of plastic, etc. For example, the door to the housing can comprise a translucent plastic material that allows visibility into the interior of the reaction injection molding machine, whereas a balance of the housing can be comprised of a plastic that is opaque. Yet further, the various aspects of the housing can be comprised of different materials as appropriate to impart physical strength as needed. For example, the housing door can be comprised of a plastic material appropriate to impart flexibility to enable the door to be opened and closed easily but where structural support is not typically needed, whereas a balance of the housing can be comprised of a plastic that has greater rigidity so as to impart more structural support to the reaction injection molding machine as a whole. Moreover, the reaction injection molding machine housing can be reinforced with a plurality of ribs or the like. For aesthetic purposes, such reinforcement is beneficially incorporated on the interior of the housing. Still further, the corners and any edges of the reaction injection molding machine can be chamfered to impart additional strength to the housing, for example.

On an interior of the housing, molding support components are securable therein. In some aspects, the molding support components are operably engagable with a plurality of lead screws and stepper motors, where such lead screws and stepper motors are configurable to provide engagement of the individual mold parts to provide a mold suitable for use in injection molding to generate the desired fabricated part. Alternatively, the molding support components can be operably engaged with one or more hydraulic pistons, electric linear actuators or other linear movement devices to provide engagement of the mold parts so as to allow the respective mold parts to engage to provide a mold suitable for injection molding as described herein.

In some aspects, all or part of the molding support components are removably engageable with the interior of the reaction injection molding machine, such as by way of screws, pins, clamps or the like. Such removable engagement can allow replacement of the molding support components due to wear and breakage. Modularity of parts in this regard can also facilitate repair of the reaction injection molding machine by a user.

As noted, the configuration and size of the fabricated parts made in the reaction injection molding machine of the present disclosure can be substantially determined by the design of the molds generated for use in the disclosed reaction injection molding machines. Any mold type that is usable for reaction injection molding in larger format machines can be modified for use herein, as long as it is configurable to be engageably removeable (or removably engaged) with the reaction injection molding machine as discussed herein. The molds suitable for use in the disclosed technology can comprise spray metal molds, steel molds, aluminum molds, plastic molds, kirksite molds, composite molds comprising use of multiple materials (for example, a plastic base with aluminum insert cavities), silicone or soft rubber molds, or zinc molds. In some applications, spray metal molds can be used to enhance control of surface quality and can offer improved moldability. Aluminum or steel can be used when increased physical properties of a urethane material system are indicated, or longer mold life is needed. Aluminum or steel can be used when increased physical properties of a urethane material system are indicated, or longer mold life is needed. The reaction injection molding machine of the present disclosure allows a wide variety of mold components to be used, thereby providing a highly modular and flexible machine design and functionality. Moreover, the ease with which the molds may be exchanged by a user expands the use cases for injection molding. In some applications, spray metal molds can be used to enhance control of surface quality and can offer improved moldability.

In accordance with various aspects of the present disclosure, molds suitable for use in the reaction injection molding machines of the present disclosure can be fabricated from CAD or other computerized models, as is known. A mold maker can generate reaction injection molding machine molds for use in the disclosed technology according to known methods from such renderings. The renderings can be uploaded into the cloud for offsite mold generation and fabrication and shipped to the location where the reaction injection molding will be conducted, as also is known. In an exemplary example, a mold fabricator can provide a 3D CAD model and design a mold from that model using techniques generally known in the art, such as computer numerical control (CNC) machining and electro discharge machining (EDM) techniques to generate the mold, generally in two pieces. When assembled, each mold can comprise at least a cavity side and a core side, which can also be referred to herein as "first mold part" and "second mold part," where the specific identity of each as either the core or cavity side is determinable from the context in which the terms are used. In some cases, the molds can further comprise inserts, slides or other suitable componentry to allow complex shapes and undercuts to be created in the finished parts where such would not readily be achievable through a simple cavity/core mold design.

Lower weight molds are easier for users to switch out componentry, and can reduce wear and tear on the reaction injection molding machine. To maintain the weight of the mold as low, for example so as to facilitate in the ease of changing out the mold from the machine, the molds used in the reaction injection molding machine can comprise "hybrid" molds. Such hybrid molds utilize various material combinations to provide an appropriate ratio between needed durability of the mold and weight. For example, a mold suitable for use in the reaction injection molding machine of the present disclosure can utilize plastic componentry, such as POM (Polyoxymethylene (Acetal)) or ABS (Poly(Acrylonitrile Butadiene Styrene)), to machine a frame structure for the mold and utilize aluminum to create the cavity and core inserts for the mold. The aluminum cavity and core inserts would then be intimately attached to the frame in such a way that the mold comprises a monolithic structure having a light weight, plastic frame, with a durable aluminum insert. In this regard, the aluminum insert can provide durability and longevity throughout a series of molding cycles of the mold and the plastic frame provides a lighter weight mold overall.

Molds suitable for use in the molding technology disclosed herein can be fabricated by, e.g., casting liquid resin (silicone, epoxy, urethane, etc.) around a 3D rendering of a part that can be replicated by an injection molding operation. The part to mold could be derived from a 3D printed part, a CNC part or a previously injected molded part. For generation of the mold, the part can be secured in a frame and liquid resin can be injected around the secured part in such a way to fill the entire space around the part. Upon hardening, the mold is opened along a desired parting line and the part can be removed from the mold. The mold would then have an internal cavity space representing the part. This mold would then be ready to use in the disclosed reaction injection molding machine.

A further method for mold making could comprise the use of 3D printers, where a 3D printer can fabricate the mold from a 3D CAD file designed by a mold maker. The use of 3D printers to make molds can provide for rapid, low cost solutions to making molds. Additionally, the machine could have a 3D printer built in to the internal workings of the machine in such a way as to print a mold and then immediately begin injecting resin in to the mold cavity. This method could facilitate an automated process from mold making through injection molding whereas the mold, printed by a 3D printer inside the machine, was integrated into the reaction injection molding process whereby the molds can be generated in real time as opposed to offsite at another factory or on another machine.

Using 3D printers, molds for use in the reaction injection molding machines and processes of the present disclosure can be generated in real-time or substantially real time. The low pressures utilized in the reaction injection molding processes of the present disclosure can be utilized to make polymeric molds suitable for use in the disclosed molding technology. Since the reaction injection molding machines of the present disclosure are generally intended for production runs of relatively low volumes, the lower wear tolerance usually associated with polymeric runs is of lesser concern, especially in view of the low pressures and temperatures used in the reaction injection molding processes herein. Moreover, even if the parts wear out, the on-demand availability of molds generated by 3D printing can allow such parts to be generated quickly. Rapid prototyping can be greatly enhanced by the combination of 3D mold printing with the reaction injection molding machines and methods of the present disclosure. 3D printed molds also allow verification of injection mold designs before investing in expensive metal molds.

When 3D printed polymeric molds are used, 3D printing processes suitable to produce parts to a high accuracy and having excellent surface finish can be desirable. To this end, stereolithography (SLA) 3D printers can produce completely solid, smooth parts that can withstand the temperature and pressure of the reaction injection molding processes herein. 3D prints produced by SLA are chemically bonded such that they are fully dense and isotropic, producing functional molds suitable for use herein. As would be recognized, stereolithography uses UV lasers directed via dynamic mirrors onto a bed of liquid plastic to cure patterns, cross-section by cross-section.

Additive inkjet printing can also be used to generate polymeric molds, for example with PolyJet™ printing. PolyJet™ and related additive inkjet printing (referred to collectively as "PolyJet" for convenience) uses multiple print heads to deposit liquid plastic onto a clean build platform layer by layer. The material is cured as it is deposited. PolyJet can deposit material in layers as fine as 16 microns.

SLA and PolyJet both require support material to ensure accuracy, anchor parts to the build platform and aid the creation of delicate, overhanging features. SLA supports are created out of the same material as the final part and must be sanded and removed by hand. SLA parts are not built fully cured in order to drain out excess resin, and therefore (aside from support removal) they require additional curing in a UV oven. PolyJet parts are built fully cured. PolyJet supports are created out of a separate material specially formulated to release from the final part with water blasting and some hand labor. Both methods can produce suitably smooth molds; PolyJet parts offer a smoother surface right off the build, stereolithography parts generally are sandable after curing is complete.

To generate a two part 3D printed mold for use in the reaction injection molding machines and methods of the present disclosure, a CAD design of the desired part is provided using known methods. 3D printed mold design is similar to techniques used to generate metal molds. Once the part is designed, the mold design is then created in 2 parts. As would be known, the mold design can take into account the design and operational parameters associated with reaction injection molding processes. To this end, some minor design modifications may be beneficial when using polymeric molds vs. metallic molds, but such modifications are readily achievable by one of ordinary skill in the art. Each mold part is then printed using a suitable 3D printing device, followed by removal of the support structure from each part, as would be known. Post-curing is generally desirable to ensure appropriate hardness of the mold parts, but materials choice and time between mold creation and use in the reaction injection molding machine will generally dictate whether such post-curing is indicated. If sanding/smoothing of the interior portions of the mold parts is desirable, this can be conducted. Once the polymeric mold parts are ready for use, the parts are secured in the machine for use, in accordance with the description set out in this application. The molding process can then be started, also as set out in detail herein.

In one aspect, the 3D printer can be in operational engagement with the reaction injection molding machine. The 3D printed mold can then be automatically generated and automatically inserted into the reaction injection molding machine so as to allow little to no human supervision. Once generated, the molded parts can be automatically ejected as described elsewhere herein. When new parts are to be generated, new mold parts can be generated in accordance with stored mold designs.

3D printing in metal is emerging as a methodology, and is expected to be a viable mold-making technique in the future. As such, the technology disclosed herein can be used with such "additive metal manufacturing." Metals available for 3D printing include Stainless Steel 17-4PH, Stainless Steel 316L, Aluminum (AlSi10Mg), Inconel 625, Inconel 718, Titanium (Ti64) and Cobalt Chrome (CoCrMo)5. In general, these materials exhibit weld-ability and strength comparable to conventionally built metals. Higher tensile strength materials include INCONEL 625 and CoCrMo. Ti64 is a biocompatible material; parts 3D printed with this material meet ASTM F1372 requirements for gas distribution system components. The process to generate 3D printed metallic mold parts generally follow the steps described above with regard to generating 3D printed polymeric parts. Design modifications appropriate for generating and using such metallic mold parts can be determined by one of ordinary skill in the art with trial and error.

Metal 3D printing begins with metals provided in powder form. The powdered metal materials are heated and fused by a laser using that energy to weld the mold designs from CAD representations layer by layer by addition of metal powder to the previously formed layers. In one non-limiting example, a roller in a 3D printer spreads out a very fine layer of metal, such as aluminum in powder form. A laser then sinters and solidifies the areas that are part of the design as defined by a CAD file. A subsequent layer of powder is then provided, such as by rolling and then sintering the rolled powder as defined by the design features for the mold. Such powder application continues layer by layer until the desired mold design is completed.

Ejector pins and other methods of part ejection from the mold may be indicated in a molding process molding process. In some aspects, the molded parts are ejectable from the mold assembly by way of ejector pins in operational engagement with the machine. Yet further, springs in operational engagement with the machine are configurable to provide ejection of the fabricated part from the mold assembly.

The molds fabricated for use in the disclosed molding technology are appropriately engageable with the reaction injection molding machine of the present disclosure. In this regard, each of the molds comprises a first mold part and a second mold part that are each configured to connectably engage to provide an assembled mold suitable for use in an injection molding operation with the reaction injection molding machine of the present disclosure. Each of the first and second mold parts are securably engagable with a corresponding first and second mold engagement plate, for example, via a plurality of complementary mold part alignment pins or other type of fasteners disposed on each of the first mold part and first engagement plate and the second mold part and second engagement plate. Each of the mold first and second mold parts can be securable to the first and second mold engagement plates, respectively, via a plurality of mold alignment screws that are configured to align with corresponding engagements on the respective mold parts. In various aspects, each of the mold engagement plates and corresponding mold parts fabricated for use in the reaction injection molding machine of the current disclosure comprise complementary components to allow slidable, threadable or other types of securable engagement.

The mold part engagement plates are each, independently securable to the interior of the reaction injection molding machine. The mold part engagement plates can be securably engaged with mold support plates, each of which are on an exterior side of the respective mold engagement plates. The mold support plates can be removably secured to the interior of the housing, such as by screws or the like.

In some aspects, the mold part engagement plates can be engageable toward each other within the reaction injection molding machine via at least two lead screws disposed on a top side and a bottom side of each of the engagement plates. The lead screws are securably engaged to the mold support plates, for example. Each of the mold part engagement plates can slidably engage with the lead screws via connections as discussed further herein. The movement of the mold part engagement plates can be facilitated by at least two guide rails disposed proximate to the top lead screw and the bottom guide rail, or through the use of guide rails on the bottom, side or top of the mold engagement plates. Other supporting features such as guide pins can also be included.

One or both of the mold engagement plates can move to bring the respective mold parts together, to generate an assembled mold. In some aspects, only one plate will move, and the other plate will stay stationary. The latter can be beneficial to allow molds of varying sizes to be suitably attached in the reaction injection molding machine during use. In this regard, the first mold part and the second mold part can be sized to fit on corresponding fasteners, for example bolts, that are permanently fixed in the reaction injection molding machine in association with the mold engagement plates. The mold engagement plates can, in turn, be sized with bolts or other fasteners that are appropriately sized for the specific mold being used in a particular fabrication effort. Larger molds can present more and/or differently spaced fasteners (e.g., bolts) than may be needed with a smaller mold. The mold engagement plates can be provided in a plurality of sizes, wherein such differently sized engagement plates are removably attachable to the interior of the reaction injection molding machine. The user can exchange the mold engagement plates as appropriate to match the alignment pins with a first and second mold part to be used in the reaction injection molding process.

In some aspects, the assembled mold is configured to make a single part in each molding operation, that is, with each injection of material in a single mixing operation and with a single mixing nozzle use. Still further, the assembled mold is configured to make multiple parts of the same design in each molding operation, that is, with each injection of material in a single mixing operation and with a single mixing nozzle use. Yet further, the assembled mold is a "family mold" configured to make multiple parts of different designs in each molding operation, with each injection of material in a single mixing operation and with a single mixing nozzle use, where a "family mold is a kind of multi-cavity mold where each cavity produces different parts of the same product. The parts produced by the different cavities may also be unrelated, they can belong to the same product line or to the same project.

The assembled mold can incorporate a mixing nozzle insertion point disposed into an interior of therein, wherein the mixing nozzle insertion port is configured to allow insertion of at least a portion of a distal end of the mixing nozzle. The mixing nozzle can be secured at the mixing nozzle engagement point, which can be located proximal to the mixing nozzle insertion port. As discussed further hereinafter, when the mixing nozzle is in fluid communication with each of the reactant materials needed for the reaction injection molding processes, the mixed reactants can be introduced into the interior of the assembled mold so as to fabricate a part in the reaction injection molding machine herein. In one aspect, a distal end of a mixing nozzle is insertable through a first mold part secured to a first mold engagement plate, where the first mold part is engaged with a second mold part secured to a second mold engagement plate to provide an assembled mold.

The reaction injection molding machine of the present disclosure is configurable to validate that each of the mold parts are appropriate for use in the reaction injection molding machine. When the mold part(s) are validated, the reaction injection molding machine can be configured to proceed with a molding operation. Either or both of the mold parts can incorporate a mold identification tag or code that is transmittable to a mold identification signal receiver associated with the reaction injection molding machine. Such tagging or identification code can be provided by RFID, bar code scanning, direct connection circuit (e.g., wires directly connected between the machine and a small chip on the mold), physical marks, and active systems where communications (e.g., Wifi, Bluetooth, etc.) are natively embedded on one or more of the mold parts so that each tank incorporates communications functionality. In some aspects, the mold identification code can allow identification of molds that are authorized for use in the reaction injection molding machine of the presentation disclosure. To this end, an authorization code may be generated to be incorporated into the control or processing circuitry associated with the reaction injection molding machine.

To ensure that molds used in the disclosed technology are appropriately generated to ensure that quality parts and pieces can be fabricated from the reaction injection molding machine of the present disclosure, the machine can be configured to lockout or otherwise disable unauthorized molds from being operational therein. As would be recognized, unauthorized (that is, counterfeit or the like) molds may not be configured to the necessary quality specifications needed for the pieces and parts being fabricated in the reaction injection molding machines of the present disclosure. Such quality specifications may be important for some or even substantially all of the uses in which the pieces and parts are intended for use, and molds that cannot be assured to conform to such requirements should not be useable in the reaction injection molding machines in the present disclosure. Such molding quality specifications can include cycle time, molding pressure, clamping pressure and molding temperature, among other parameters.

Improperly fabricated molds, such as those made using inferior techniques, can result in the fabricated parts being of low quality. Moreover, such improperly fabricated molds can be subject to premature failure, such as breakage during use, where such breakage can result in damage to the reaction injection molding machine. The control or processing circuitry associated with the reaction injection molding machine is therefore configurable to identify the mold parts via a mold identification code that is transmittable to a mold identification signal receiver associated with the reaction injection molding machine as authorized for use in the machine. If the unique identifier provided by the mold part(s) (or if the unique identifier is missing) indicates that the mold part(s) are not authorized, the control or processing circuitry associated with the reaction injection molding machine is configurable to lockout the mold from use, such as by deactivating the reaction injection molding machine until the mold-machine mismatch is corrected. The control or processing circuitry optionally includes an override that can allow the reaction injection molding machine to operate without the authorization code or other mold validation code. This override can be controlled through a remotely located server (e.g., by the machine supplier), which is in communication with the reaction injection molding machine through a network or other communications link. The parameters of the reaction injection molding machine can be updated or modified by the machine supplier to, for example, override existing molds and materials constraints.

Yet further, the reaction injection molding machine can be configured to perform one or more quality checks to ensure that the molds retain the ability to generate pieces and parts of suitable quality specifications. In this regard, prior to becoming operational for the first or in a subsequent operation or during extended operation, the reaction injection molding machine can perform one or more mold quality checks that may include, in non-limiting examples, determination of molding pressure, cycle times, clamping pressure, and reactant material temperature, where such information is obtained from a plurality of sensors in operational communication with the reaction injection molding machine. The acquired sensor data can be compared with baseline values that are incorporated in the control or processing circuitry associated with the reaction injection molding machine. Should one or more aspects of the quality check show that the reaction injection molding machine or its attendant operational parameters are out of compliance with one or more specifications, the machine can be configured to lockout or otherwise be disabled from operation. In some aspects, the user can be provided with a notice and instructions on how to bring the reaction injection molding machine or its components into compliance so that operation can be reinstituted.

In some aspects, molding quality checks can be facilitated in use by optional incorporation of a camera into the interior of the reaction injection molding machine, whereby images can periodically be generated during operation of a molding process. Such images can be provided for viewing to a technician located near the site of the reaction injection molding process or remotely who can confirm that the operation of the reaction injection molding machine, and any molds incorporated therein, are suitably operational in a specific process. If it is determined that the machine and/or any molds are not suitably operational, the instructions can be provided to lockout operation of the reaction injection molding machine to allow suitable repairs or adjustments to be made. The technician can make adjustments to the machine operation remotely, if appropriate.

The reaction injection molding machine of the present disclosure can optionally include cooling functionality that can be introduced proximate to the injection molding station. As would be recognized, such cooling can facilitate curing, thereby allowing cycle time to be decreased, with a corresponding increase in the number of parts that can be fabricated per unit time. Such cooling can be provided by a fan disposed proximate to the injection molding station, although other forms of fan placement and cooling are contemplated. However, generally, a substantial benefit of the reaction injection molding machines and processes of the present disclosure include relatively minimal heat generation using most resin selections. Fans may also be desirable to dissipate fumes from the interior of and proximal to the reaction injection molding machines. Any fans incorporated in our around the reaction injection molding machines can be configured with a NIOSH filter to reduce the fumes associated with the injection molding process.

Still further, the control or processing circuitry associated with the reaction injection molding machine can be configured to measure the various operational parameters of the reaction injection molding machine during use and confirm that the device is suitably operational therein. If one or more operational parameters are not in compliance, where such compliance is provided by defined specifications associated with a particular molding operation that are incorporated in the control or processing circuitry associated therewith, the reaction injection molding machine can be instructed to stop part fabrication so as to enable adjustment or maintenance. Alternatively, if out of compliance operation is found, the reaction injection molding machine can be configured to slow down the speed of part fabrication as needed to bring the operation into compliance.

Another aspect of the disclosed technology comprises the configuration of the reactant materials utilized with the reaction injection molding machine of the present disclosure. In this regard, each of the reactant materials, that is, the part A and part B (as well as any auxiliary materials, if present), can be incorporated into removable raw material reactant tanks specifically configured for use in the reaction injection molding machine. In some aspects, the reactant materials can be incorporated in tanks that are removeably configured to each, independently, be sealably engageable with associated engagement ports in an engagement station. In some aspects, the removable engagement is facilitated, in part, by a check valve on the reactant materials tank where the reactant materials tank is configured to sealably engage with a corresponding engagement port that is, in turn, configured with fluid communication components associated with the reaction injection molding machine.

In some aspects, the engagement ports can be configured with check valves. The engagement ports can also each, independently, be configured with a check valve. The engagement port check valves are configurable to provide a substantially leak proof seal between an associated reactant materials tank and each of the engagement stations and, therefore, the corresponding fluid communication channels. In this regard, the interior, that is, any fluid communication associated with the reaction injection molding machine can be substantially sealed when a reactant materials tank is not engaged in a port. When a reactant materials tank is engaged with a port, the check valve in the port and the check valve in the tank can then allow raw material to flow from the tank into the machine. The sealable engagement between the reactant materials tank and the corresponding fluid communication components can also comprise a friction fit, a gasket seal fit, a spring latch lock, or a screw-type fit, with the fit appropriately providing the ability to obtain a substantially leak-proof connection between the reactant materials tank and the fluid communication components.

The reactant materials engagement stations can be fabricated from any material in which the componentry can be incorporated therein. The engagement stations are intended to be suitably durable to last for extended uses. Accordingly, the engagement stations can be comprised of stainless steel or aluminum, or other suitably durable materials.

The fluid communication componentry in operational engagement with the one or more reactant materials engagement stations can comprise tubing or hoses that are fabricated from (or lined with) material that is substantially chemically impervious—that is, unreactive with or insoluble in—the reactant materials used in the reaction injection molding processes and that can withstand the associated pressures of the molding operation, for example about 10 to about 500 psi.

Still further, the pressures applied in the molding processes of the present disclosure substantially do not exceed about 500 psi. It has been found that the ability to conduct molding operations under such relatively low applied molding pressures enables a variety of part sizes to be fabricated using the systems and methods herein. In this regard, thermoplastic injection molding requires high pressures to ensure that the melted resin can adequately fill all portions of the mold so as to avoid short shots, especially when fabricating small parts and/or parts having fine details. As would be recognized, a "short shot" is the incomplete filling of a mold cavity that results in the production of an incomplete part. This happens when the flow of the thermoplastic resin freezes off before all of the flow paths in the mold have been filled. In such prior art thermoplastic resin injection molding processes, the high pressures needed to ensure adequate resin flow also requires larger equipment footprints in order to accommodate the pressure generation equipment (e.g., air compressors) that can provide the necessary pressure required for complete resin flow through the mold. Accordingly, the use of thermosetting resins herein, which require pressures of less than about 500 psi, enables a heretofore unavailable equipment footprint.

The reactant materials engagement ports in the reaction injection molding machine allow the reactant materials tank to be sealingly mounted into the interior of the reaction injection molding machine so as to facilitate generation of the compact footprint of the machine of the present disclosure. The plurality of reactant materials tanks are substantially situated within the interior bottom footprint of the reaction injection molding machine, where the bottom footprint comprises the maximum area defined by the width and length of the machine as measured proximate to the lower portion of the machine.

Yet further, the mouth area of the reactant materials tank can be securely engaged with the reaction injection molding machine during use. Such secure engagement can be provided, for example, by a spring loaded latch mechanism configured to keep the tank intimately engaged in a check valve assembly/configuration. When this spring loaded latch is manually released, the reactant materials tank (or resin tank) can separate from the engagement port and the check valve assembly can return to a closed state, thus substantially sealing the tank contents from ambient conditions. While the check valve can substantially prevent the reactant material from leaking from the tank, a screw-top or other seal can also be removably associated with the mouth of each reactant materials tank, for example, to ready the reactant materials tank for long term storage.

Each reactant materials tank can incorporate a pressure regulating check valve to maintain the internal air pressure substantially regulated as the reactant materials are removed from the tank during molding operations. Such a pressure regulating check value can be set to maintain the air at any level of vacuum applied to the tank during use. It has been found that the air inside a tank should be regulated to reduce the possibility that air entrapment inside of the reactant materials (or resin) tank might cause bubbles to be formed in a fabricated part. When the reactant materials tanks are filled, a small vacuum (e.g., about 5 psi below ambient air pressure) can be drawn on each tank. A small pressure regulating check valve can be incorporated into the top of each tank (e.g., opposite the mouth area) to maintain a constant vacuum in the reactant materials tank. As the reactant material (e.g., part A or part B) leaves the tank, the pressure regulating check valve can let a small amount of air into the tank to maintain the pressure level. The air allows the reactive material to continue to leave the tank while minimizing the amount of new air (and humidity) that enters the reactant materials tank.

Yet further, the water vapor present in the air that is in contact with the resin should be minimized. In particular, water vapor can damage the properties of resins and/or catalysts and can affect shelf life of the materials in the tanks. Desiccants and other water absorbing materials can therefore be optionally incorporated into or proximal to either or both of the reactant material tanks.

The respective reactant material tanks can be designed for specific complementary fit in the engagement in the corresponding port. For example, the first reactant materials tank can be configured to fit only in the reactant materials port associated with that tank. The second reactant materials can be configured to not fit in that the first reactant materials tank port or slot, so that the user does not accidently engage the reactant materials tank comprising part A to the port where the reactant materials tank comprising part B should be engaged, and vice versa. Yet further, the first reactant materials tank is configured to suitably engage only with the first engagement port, and the second reactant materials tank is configured to suitably engage only with the second engagement port.

Removal and insertion of the respective reactant materials tanks can be facilitated by a lockable engagement, such as by a latching mechanism. For example, when a user engages a reactant materials tank in an associated raw materials port, a latch can be engageable to secure the tank in the port. Upon removal of the tank, the user can release the latch to allow the tank to be removed from the port within which it is engaged. The latch can "unlock" the engagement and, in some aspects, can provide a disengagement force that can assist in dislodging the tank from the engagement port. In some aspects, the replacement of tanks can be facilitated by the incorporation of a rotatable or slidable aspect in the reaction injection molding machine. For example, a plurality of tanks can be removably engaged on a rotatable or hinged component.

The control or processing circuitry associated with the reaction injection molding machine can also be configured to notify the operator of a mismatch between the appropriate port engagements. In this regard, one or a plurality of reactant tank ports (or part A tank port or ports) on the reaction injection molding machine can be specifically configured to mate with a reactant materials tank configured to contain part A and one or a plurality of tank ports (or part B tank port or ports) can be specifically configured to mate with a reactant materials tank configured to contain part B. For example, the reactant materials tank ports can include key-ways that match with corresponding reactant materials tanks. The key-ways can comprise one or more open or covered slots (or grooves) located on one or both sides of the tank ports that allow the one or more keys (e.g., tabs or protrusions) on one or more sides of the reactant materials tanks to slide into during installation of the corresponding reactant materials tank. If a user attempts to mate a part A reactant materials tank with a part B tank port, the reaction injection molding machine can be configurable to lockout or disable the machine from operation and to provide information to the user that the orientation of the ports needs to be corrected.

Yet further, the reaction injection molding machine can be configurable to confirm to a user that the reactant material tanks are engaged in the correct port. In this regard, each reactant materials tank can comprise a unique identifier that is readable by the reaction injection molding machine, and the correct placement thereof can be confirmed. Detection of a suitable reactant materials tank is in the appropriate port can be facilitated by mechanical switches, a bar code reader, infrared detectors, RFID or the like. For example, each reactant materials tank can include at least one of a RFID tag, optical recognition, physical sensing, etc. If no reactant materials tank is detected in an associated engagement port that is configured for engagement with the particular port, or the reaction injection molding machine control or processing circuitry detects that a reactant materials tank engaged with the port is spent, or that a reactant materials tank was not fabricated by an authorized source or refilled by an unauthorized party, reaction injection molding machine can prompt the user to insert a new or different reactant materials tank. Moreover, the reaction injection molding machine can include lockouts that prevent the reaction injection molding machine from operating unless the operator completes the directed operations related to the reactant materials tank(s). Once the tank/port mismatch is corrected, the reaction injection molding machine can then again be made operational.

While each of the reaction injection molding machines of the present disclosure can be configured to incorporate reactant materials tanks having each of a part A and a part B, when engaged with the machine (as discussed in detail hereinafter), the first reactant materials tank can comprise part A or part B components and vice versa. While in a specific machine the part A reactant material tank can be configured to engage with a specific port in the engagement station, as used in the specification and claims herein, this part A tank can comprise either the first or second (or third or fourth etc.) reactant materials tank.

Each of the part A and part B reactant materials, for example, a catalyst and a polyol, can be incorporated within the respective reactant materials tank for use with only a small amount of air or substantially no air being incorporated therein. In some aspects, after reactant material is incorporated in each tank, a partial vacuum can be applied to the tank. It has been found that by ensuring that the reactant materials in each tank remain partially under a vacuum when delivered from the reactant materials tank, the reactant material will comprise a lesser propensity to generate bubbles when injected into the mold. The substantial absence of gas bubbles in the reactant materials before and after they reach the mold can enhance the finished quality of the fabricated part. Yet further, a full vacuum can be applied to the reactant materials tanks so as the reduce the propensity of air bubbles to be generated. For example, a vacuum pressure of about 5 psi below ambient pressure can be established in the filled reactant materials tanks. The tank vacuum (or pressure) can be regulated using a check valve in, e.g., the top of the reactant materials tank. As the resin leaves that tank, the check valve can allow a small amount of air into the reactant materials tank to maintain the desired vacuum (or pressure) in the tank.

As reactant material is removed from each tank when molding operations are occurring, the amount of internal pressure applied in each tank will accordingly decrease. Each reactant materials tank can be configured to withstand the maximum pressure reduction to which it is subjected. The housing of the reactant materials tank should comprise a material that can withstand up to about 29 Hg of internal pressure (or vacuum) when a pumping action is applied to an exit port configured to deliver reactant materials to fluid communication component for use in the reaction injection molding process.

The reactant material tanks should also be fabricated from materials that are substantially chemically impervious—that is, unreactive and insoluble—to the reactant materials used in the reaction injection molding processes. The housing of the reactant material tanks can be fabricated from any material that can suitably store and deliver reactant materials and be able to withstand the pressures to which the tanks are subjected in use. In this regard, the tanks can be made out of high density polyethylene ("HDPE") generated from injection molding processes, as one example, or stainless steel.

To better enable the reactant materials tank to suitably withstand pressure in use, the interior portion of each reactant materials tank can comprise one or a plurality of reinforcement structures that increase the wall strength of the reactant materials tank in use. In one aspect, the reactant materials tank reinforcement can comprise a plurality of reinforcing ribs disposed on the interior walls of the reactant materials tank. In another aspect, the reactant materials tank reinforcement structures can comprise at least one or a plurality of "kiss-offs" provided on the interior walls of the reactant materials tank. As would be recognized, a kiss-off comprises the connection of two closely spaced parallel walls whereby two relatively weak walls (e.g., opposing walls in a reactant materials tank formed from HDPE) are modified into an integral box beam structure that is stronger than the individual walls. These kiss-offs can be elongated, round or any shape that provides suitable structural support to the reactant material tanks of the present disclosure.

The strength of each reactant materials tank under pressure can further be enhanced when the reactant materials tank walls are suitably thick. In some aspects, the reactant materials tank walls are at least about two millimeters thick. Yet further, the reactant materials tank walls are at least about 3 or about 4 or about 5 millimeters thick.

The reaction injection molding machine can be configured with at least one pump controlled by, for example, a stepper motor, wherein the at least one pump is in operational engagement with each of the reactant material tanks and the respective fluid communications components so as to generate a first and a second reactant materials fluid stream for the part A and part B materials in the injection molding process. In some aspects, a single pump is in operational engagement with each reactant materials tank. In other aspects, each reactant materials tank is in operational engagement with at least one pump and a corresponding fluid communication component. Suitable pumps for use herein can each, independently, have a total power of about 300 W at 48V, for example.

The reactant material tanks are configurable to generate a signal that can notify the user of a fill level to the user via the control or processing circuitry. A variety of fill level indicator techniques can be used. In some aspects, each reactant materials tank can be configured on the interior thereof with a magnetic float to allow reactant material level to be measured and reported. As would be recognized, magnetic floats can provide information about fill level in a closed system using the characteristics of the magnetic field therein. One or more sensors, for example Hall Effect sensors, can read the magnetic field corresponding to a known distance the float is from the sensor(s) to generate information about the amount of resin left in the tank. In some embodiments, a plurality of Hall Effect sensors can be vertically aligned along the side of a reactant materials tank to detect the position of the magnetic float inside the reactant materials tank. For example, 16 Hall Effect sensors can be used to detect the current position of the magnetic float as it varies with the reactant material level in the tank. In other aspects, the reactant material fill level can be obtained for reporting via pressure sensors, weight determination or the like.

Should the reactant material level in a tank be too low or not enough in a single part of reactant material tanks to allow the user to generate the desired number of fabricated parts in a run, control or processing circuitry associated with the reaction injection molding machine can be configured to prevent the operation thereof until the user replenishes the specific tank. Moreover, the reaction injection molding machine control or processing circuitry can be configured to provide a fill level to the user on demand or continuously during operation. The user can be notified by an indication or other signal provided on the reaction injection molding machine and/or on a peripheral device, such as a laptop, tablet, or smartphone. Information about the fill level, as well as any other relevant operational parameters, can be transmitted for review to a remote server, or can be stored for later review.

The number of reactant material tanks in the reaction injection molding machine engageable with the reaction injection molding machine can vary, while still allowing the machine to comprise the "small footprint" aspect, as discussed previously. In one aspect, about 2 to about 8 reactant materials tanks can be engageable with the machine, where each tank can comprise from about 1 to about 2 gallons of reactant material in each tank. For operation, the engagement station incorporates at least two reactant material tanks configured for use with the disclosed molding technology—that is, part A and part B. These at least two reactant materials tanks are referred to herein generally as "a first tank," and "a second tank," without reference to whether the first tank or the second tank is the part A or part B, because, for example, the identity of the materials can be provided by the user and/or confirmed by control or processing circuitry associated with the reaction injection molding machine.

The reactant material tanks are suitably sized to fit within the machine overall and the engagement station(s), as well as to facilitate carrying and insertion into the reaction injection molding machine when fully charged. Multiple tanks of each of the reactant materials can suitably be incorporated into the reaction injection molding machine to reduce the need to change tanks during a fabrication run. For example, the reaction injection molding machine can be configured with up to about 8 gallons of reactant materials (e.g., 4 gallons of part A and 4 gallons of part B). When more than the at least two reactant material tanks are present, the additional tanks can be referred to as the "third reactant materials tank," "fourth reactant materials tank," "fifth reactant materials tank," "sixth reactant materials tank," "seventh reactant materials tank," and "eighth reactant materials tank." Similarly, the respective engagement ports in the reactant materials tank engagement station can be referred to as the "third reactant materials tank engagement port," "fourth reactant materials tank engagement port," "fifth reactant materials tank engagement port," "sixth reactant materials tank engagement port," "seventh reactant materials tank engagement port," and "eighth reactant materials tank engagement port."

While all of part A and part B tanks can be engageable with a single engagement station, in some configurations, each of the first and second reactant materials tanks can be configured to engage with separate engagement stations. Irrespective of how many engagement stations are used, each of the engagement stations are operationally configured to provide fluid communication between the reactant material tanks and the injection molding mixing nozzle and mold assembly. In this regard, the part A and part B reactant material tanks can each, independently, be engaged with tank engagement ports that are operationally configured with a single engagement station. Yet further, each tank can be configured with a single engagement station (and associated tank engagement ports), whereby each of the stations is configured to provide fluid communication with the mixing nozzle and the mold assembly.

Yet further, the area proximal to the each of the reactant material tanks can be configured to provide heat to reduce the propensity of the reactant material to deteriorate upon storage. In this regard, a heater can be placed proximal to the tanks, where such heater can be augmented with a fan. Yet further, the engagement station(s) can be configured to heat the reactant material in conjunction with the generation of a fluid stream of one or both of the reactant materials. The temperature proximal to the storage tanks can be maintained at from about 15° C. (59° F.) to about 41° C. (105° F.) to ensure consistent reactant quality in use.

The control or processing circuitry associated with the reaction injection molding machine can be configured (e.g., via software and/or hardware components) to automatically close the check valve (or other isolation valve) in an empty (or substantially empty) reactant materials tank, and open the check valve (or other isolation valve) of another tank that is positioned in the engagement station, where that additional tank comprises the same reactant material therein. The plurality of reactant materials tanks can serve as a backup supply of reactant materials in the plurality of engagement ports further facilitates the ease of operation of the reaction injection molding machine of the present disclosure. The control or processing circuitry can also be configured to operate the check valves (or other isolation valves) in the respective engagement ports or stations.

Each of the reactant material tanks can be uniquely tagged or otherwise identified. Such tagging or identification can be by RFID, bar code scanning, direct connection circuit (e.g., wires directly connected between the machine and a small chip on the tank), physical marks, and active systems where communications (e.g., Wifi, Bluetooth, etc.) are natively embedded on (or in) each of the tanks so that each tank incorporates communications functionality. The reaction injection molding machine can incorporate a lock-out mechanism that disables the reaction injection molding machine, for example by disabling the control or processing circuitry and/or preventing the housing door from being opened, when an untagged or improperly tagged reactant materials tank is inserted into the reaction injection molding machine by a user.

Moreover, as discussed elsewhere herein, the reaction injection molding machine and associated control or processing circuitry allow effective monitoring of reactant material usage. Thus, a mismatch between reactant material amounts and monitored reactant material usage can also be used to generate a lockout or disablement mechanism. Such a lockout or disablement mechanism can be particularly suitable to ensure that appropriate reactant material reactant materials are utilized so as to ensure that the reaction injection molding machine will remain in operational condition. The reaction injection molding machine and any attendant device used to operate the control or processing circuitry associated therewith can provide the user with a notification of the reason for the lockout or disablement, and further can provide the user with instructions on how to correct the problem.

In some aspects, the reactant material tanks can be configured for single use, and made disposable by a user when the reactant materials therein when the tank is empty or substantially empty. In other aspects, the tanks can be configured for multiple uses. For multiple uses, the reactant materials tank can be returned to an authorized refilling location (e.g., the manufacturer of the reactant materials tank) for refilling and associated quality control efforts. To ensure that the reaction injection molding machine will operate appropriately, and that the resulting pieces or parts are generated to the desired quality metrics, the tanks can be configured to allow the reaction injection molding machine to detect if a tank has been refilled by a user when such improperly refilled tank is inserted into the machine. When a tank has been refilled in an unauthorized manner, the reaction injection molding machine can be configured to lockout or otherwise disable the tank from use. The reaction injection molding machine and any attendant device used to operate the control or processing circuitry associated therewith can provide the user with a notification of the reason for the lockout or disablement, and further can provide the user with instructions on how to correct the problem. If the reactant materials tank is refilled by an authorized party, such party can reset the lockout chip that is configured in the reactant materials tank to limit or prevent unauthorized refilling.

As noted, he respective reactant material tanks can be designed for specific complementary fit in the corresponding engagement port of the engagement station. For example, first reactant material tank can be designed to fit only in the reactant materials port associated with that tank, that is, the first reactant materials tank port. As such, second reactant materials will not fit in that first reactant materials tank port, and the control or processing circuitry associated with the reaction injection molding machine can be configured to notify the operator of such mismatch. The control or processing circuitry associated with the reaction injection molding machine can also be configured to direct the operator to correct the mismatch. When the mismatch is corrected—that is, when the reactant materials port or slot is suitably engaged with first reactant materials tank—the reaction injection molding machine can again become operational. Yet further, the control or processing circuitry associated with the reaction injection molding machine can be configured to confirm that the reactant material tanks are engaged in the correct port or slot. In this regard, each reactant materials tank can comprise a unique identifier that is readable by the reaction injection molding machine and the correct placement thereof can be confirmed.

Detection that a suitable reactant materials tank is in the appropriate engagement port can be facilitated by mechanical switches, a bar code reader, infrared detectors, RFID or the like. For example, each reactant materials tank can include at least one of a RFID tag, optical recognition, physical sensing, direct communications from the tank etc. The reaction injection molding machine control or processing circuitry can report that a reactant materials tank engaged with the port is spent, or that a reactant materials tank was not fabricated by an authorized source, or refilled in an unauthorized manner, the machine or associated peripherals in communication with the machine can prompt the user to insert a new or different reactant materials tank. Moreover, the reaction injection molding machine can include lockouts that prevent the reaction injection molding machine from operating unless the operator completes the directed operations related to the reactant materials tank(s).

The mixing ratios of reactant material parts A and B can be controlled by accurate pumps (e.g., piston pumps driven by stepper motors) that are operationally engaged the control or processing circuitry (e.g., through software and/or firmware) of the reaction injection molding machine. The use of stepper motors can allow for precise control of the amounts of reactant material parts A and B used to prepare each fabricated part. In this regard, the ratios of the reactant material parts A:B can be in a range from about 1:1 to about 1:1000 (or vice versa). Notably, the close control of reactant material amounts via the stepper motors and the use of components that provide real-time or near real-time information about the amount of reactant material in each tank, the amount of reactant material used can be tracked and monitored.

As would be recognized, the amount of reactant materials used in each molding operation is directly related to the volume of the part being fabricated. In this regard, 8 gallons of reactant material can be expected to allow fabrication of about 1848 cubic inches (inch$^3$) of part(s). This could allow as few as 10 parts to be fabricated from each gallon of reactant material (for large parts with thick wall sections) to as many as 10,000 parts per gallon for very small parts.

Also, when the user selects a mold for use, the amount of reactant materials needed to fill each mold to make a part (that is, to make a shot as well as the total lot of fabricated parts desired in each mold run) can be generated by the control or processing circuitry associated with the reaction injection molding machine. The user can therefore be provided with detailed information about the number of parts that can be fabricated from the reactant materials tanks, cycle times, parts per hour, etc.

In this regard, the present disclosure further provides systems and methods for managing the operation of an injection molding process comprising the steps of: selecting a mold for use in the injection molding machine of the present disclosure, wherein information associated with the fabrication of each part in the mold is provided (i.e., the volume of each resin material receivable into the mold to generate each part), receiving information about the number of parts to be fabricated during a molding operation, and providing information associated the selection of the resins needed to conduct the molding operation. The provided selection information can be in the form of instructions to the user to order resins for use. Still further, such selection can be in the form of automatic ordering instructions to a supplier or the like to provide one or more of resin reactant tanks or mixing nozzles prior to operation of a molding operation associated with the selected mold. Still further, the systems and methods of the present disclosure comprise methods of inventorying, ordering, and using at least the removably engageable components of the disclosed technology including each of the resin tanks, the molds, and the mixing nozzles.

As discussed elsewhere herein, when installed in the reaction injection molding machine, the mold can provide a unique signal that can allow the mold identification and design to be discerned and reported. The amount of reactant material used can be further tracked and monitored from information about the mold identification and lot size. Detailed reports can therefore be generated, which can be helpful for quality control, cost evaluation, and regulatory tracking, for example.

In some aspects, the monitoring and tracking of the reactant material amounts can be used to generate an automatic replenishment of the reactant material tanks via the control or processing circuitry associated with the reaction injection molding machine. For example, if the control or processing circuitry determines that one or more of the reactant material tanks are likely to run out in a period of time, the user can automatically be provided with additional reactant material tanks, such as by sending the user an automatic delivery thereof. This replenishment information can be provided by analysis of the usage associated with a specific reaction injection molding machine, and such analysis can be used to generate predictions of when the reactant material tanks will become empty. Alternatively, the user can input planned runs with identified molds, and the control or processing circuitry associated with the machine can generate the amount of reactant material needed to fabricate those runs and molds can be determined. If the determination shows that additional reactant material will be needed, the user can be automatically provided with additional reactant material tanks. Yet further, upon fabrication of a mold for use in the reaction injection molding machine, the user can be provided with the amount of reactant material suitable along with the mold.

In some aspects, it may be beneficial to stir or otherwise agitate the reactant materials stored in the tanks between uses, especially when the reactant material tanks have been engaged with the engagement station of the reaction injection molding machine for use, and have been in use previously, but where reactant materials remain the tank and storage is required between uses. In this regard, it is possible that users of the reaction injection molding machine may only use the device on a periodic basis. This is a notable difference between prior art large format reaction injection molding machine that are typically operated continuously or near continuously in industrial-type settings. Use of the reaction injection molding machine periodically could result in the reactant materials becoming altered between periods of use. Agitation of the reactant material may be provided by manually shaking the reactant material tank up and down. Kidd-offs of the tank can provide a torturous path for the resin, helping to mix the resin as it moves around and over the kiss-offs inside the reactant materials tank.

In certain aspects, the reaction injection molding machine can include a recirculation system that can periodically remove or recirculate raw reactant material from the respective tank to generate agitation so as to reduce the propensity of the specific raw material to become viscous or to solidify. In one example, such a recirculation system can directing the reactant material from the tank through tubing and/or through a solenoid controlled manifold that allows the system to automatically circulate the reactant material. The recirculation system can periodically operate automatically, for example, at least once a day or once a week or the like. When the reaction injection molding machine is operational for fabricating pieces and parts, the recirculation system can be disengaged so as to allow the reactant material reactant materials to be circulated to the mixing nozzle as discussed elsewhere herein.

Alternatively, control or processing circuitry associated with the reaction injection molding machine can be configured to alert the user to remove one or more of the reactant material tanks and agitate the tank(s) for a period of time (e.g., about 1 minute) if the control or processing circuitry recognizes that the reactant materials tank has been engaged in the machine without being used for a period of time.

Upon activation of a molding operation, part A and part B components are introduced into a mixing nozzle by way of the respective fluid communication components from the reactant material tanks (e.g., via tubing or hoses in communication with the mixing nozzle and the respective reactant material tanks in operational engagement with the engagement station). The fluid streams of reactant materials emanating from each of the first and second reactant material tanks can each, independently, be oriented at an end point become directed into a single point—that is, the mixing nozzle engagement point—defined by a mixing nozzle proximate end, whereby this proximate end is substantially in a location where the mixing nozzle is engaged with the fluid streams of the resin and the catalyst. Each of the fluid flows can terminate in an injection molding manifold that is engagable with a mixing nozzle.

In use, reactant material parts A and part B are directed into the mixing nozzle when a mixing nozzle is securably engaged with the raw materials engagement point, such as, via a manifold or comparable component connectable to fluid communication componentry associated with the raw materials tanks, and mixing is provided by pressure generated by flow of each of the materials into the mixing nozzle. Pressures applied by the mixed reactants upon entry into the mold can vary depending on either or both of the reactant materials being used and the particular operation of the molding process being conducted (e.g., size/shape of the mold, part being fabricated etc.). In this regard, pressures can be from about 1 psi to about 200 psi. Pressures applied to the assembled mold can be from about 1 psi to about 200 psi (pounds per square inch), or about 1, 10, 50, 100, 150 or 200 psi, where any value can form and upper or lower endpoint, as appropriate.

Similarly, rate of flow of the respective reactant materials can be varied. Such rates of flow can each, independently, be from about 0.01 gallon/minute and 1 gallon/minute or from Rate of flow can be from about 0.01 gal/minute to about 1 gallon/minute. As would be recognized, the rate of flow of each reactant material can be the same or different. For example, if the optimum mixing ratio of the catalyst to resin for a particular molding operation is 1:2 respectively, the rate of flow of catalyst to resin can be provided as 1:2. Such flow rates are provided from the control or processing circuitry associated with the reaction injection molding machine and are preset from the mix ratio requirements of the resin manufacturer.

The mixing nozzles configured to fit the reaction injection molding machines of the present disclosure are removably engageable with the reaction injection molding machine at a mixing nozzle engagement point and with the assembled mold at the mixing nozzle insertion point. In some aspects, the mixing nozzle used to mix the reactive reactant material components—for example, the catalyst and the resin—are configured to allow a user to quickly change out one mixing nozzle for another. In this regard, once the reactant material reactant materials are mixed in the nozzle, that nozzle will no longer be suitable for use because the mixed materials will quickly cure. Accordingly, the reaction injection molding machine is configured for single use mixing nozzles where such mixing nozzles are removeably engageable with the machine.

The designs/shapes of the mixing nozzles are selected to provide requisite static mixing of the reactant materials. In this regard, the mixing nozzles are positioned to force a first reactant material and a second reactant material to combine as they travel through the length of the securably fixed mixing nozzle. The mixing operation can be enhanced through inclusion of internal elements in the mixing nozzle (e.g., baffles, plates etc.) so as to allow the respective fluid streams to divide, recombine, accelerate/decelerate, spread, swirl or form layers as they pass through the mixer. As a result of these alterations in the fluid flow, mixture components are brought into intimate contact.

A user can insert and replace the mixing nozzle from the outside of the reaction injection molding machine. The operator can also open the reaction injection molding machine housing door and engage a mixing nozzle to an empty nozzle engagement point.

In order to allow the mixing nozzle to be removable after fabrication of a part, the single use mixing nozzle must remain substantially free of mixed reactant material parts A and B at point where it is mounted. To this end, a threaded engagement can be used to engage the mixing nozzle to the fluid exit point. Alternatively, a B-outlet, bayonet, bell, or F-outlet engagement can be used to sealably engage the proximate end of the mixing nozzle to the fluid exit point of the reaction injection molding machine.

Mixing nozzles suitable for use herein are configured to operationally engage with the injection molding manifold that is, in turn, operationally engaged with the injection molding machine of the present disclosure. Yet further, mixing nozzles suitable for use herein are configured to operationally engage with a mold configured for use in the injection molding machines and methods of the present disclosure.

The disclosed technology further relates to methods of engaging the mixing nozzles to the injection molding machine. If necessary, the mixing nozzle engagement step is preceded by disengaging the mixing nozzle that was used in a previous molding operation. As described in more detail hereinafter, the distal end of the mixing nozzle can be disengaged from the fabricated part via a breaking, twisting, shearing or other type of operation so as to separate a sprue defined by plastic connecting the distal end of the mixing nozzle with the fabricated part. The mixing nozzle connected at the proximal end to a molded part via the sprue is also considered to be an aspect of the present disclosure. Once disengaged from the fabricated part, proximal end of the mixing nozzle, which is still engaged with the mixing nozzle engagement point, can be disengaged via unthreading or the like.

In some aspects, an automatic mixing nozzle replacement mechanism can be incorporated that can change the mixing nozzle via machine control at the appropriate time. The mixing nozzles can be configured on a spool or cartridge in such a way that they may be feed through a chamber cycling from one nozzle to the next. The used nozzles can be ejected from the machine with a new nozzle replacing the used nozzle as part of the molding process. This system can be similar to a cartridge loading system commonly seen in air powered nail guns as well as ammunition feeds (or clips) in rifles and other auto-loading systems.

When the reaction injection molding machine housing door is open and/or when a molding operation is not occurring, the reactant material pumping operational components can be locked out or otherwise disengaged so that reactant materials do not flow through the machine. Again, such disengagement or lockout can be effected by the control or processing circuitry associated with the reaction injection molding machine.

In significant aspects, operation of the reaction injection molding machine during a fabrication run should be substantially automatic—or "plug and play"—for the user. To this end, once the user installs the mold parts and reactant material tanks, the user should only need to replace the mixing nozzle in between each fabrication and remove the part from the machine, along with periodic replacing of the reactant material tanks, if required. In some aspects, the mixing nozzle attachment and disengagement, as well as the mold ejection operation, can be conducted substantially automatically.

In operation, a mold can be provided in two parts that are engageable within the mold support framework of reaction injection molding machine, such as by engaging the mold parts with corresponding engagement plates, whereby an assembled mold is provided when the engagement plates holding the mold parts are brought together. Upon moldable engagement of the two mold parts, pumping of the reactant materials from the respective tanks through the respective fluid communication components into the mixing nozzle can commence. The mixed reactant materials can be introduced into the assembled mold through a distal end of the mixing nozzle, wherein the distal end of the mixing nozzle is in fluid communication with at least a portion of the interior of the assembled mold at the mixing nozzle insertion point. The mixed reactant materials can thereby be introduced into the assembled mold.

When the total volume of mixed reactant materials needed are introduced into the mold, the mold will remain closed to allow the material to suitably cure. As noted, such total volume can be pre-determined and flow rate managed via the control or processing circuitry associated with each mold.

As would be recognized, the mixed reactant material parts will commence an exothermic reaction has a time/temp curve that correlates to cure percent of the reactant materials. Typically, this comprises an exponential curve that sets quickly and then starts tapering off. The partially cured fabricated part can remain in the mold until it is at least about 90% or at least about 95% or at least about 98% cured, where "cured" means that there are less than about 10% or 5% or 2% unreacted material remaining. Such a cure time can be about 2 minutes or 5 minutes or 10 minutes or 30 minutes or 90 minutes, depending on the materials used and the mold/part characteristics, among other things. Accordingly, the number of parts that can be fabricated in the reaction injection molding machine can vary. In some aspects, the number of cycles per hour is about 2, 5, 10, 20 or 30, where any value can form an upper or lower endpoint, as appropriate. The number of parts per hour can vary, also. For example, when the fabricated part is small, a multi-cavity tool can be used, whereby more than 1 part is fabricated in a single molding operation. For example, if 50 parts can be fabricated in a single multi-cavity mold, 50 parts can be generated in a single molding cycle. If the cycle time for this operation is about 5 minutes, about 250 parts can be fabricated per hour. Family molds can also be used as discussed previously.

Parts can be demolded quickly when they are substantially cured, but when they are removed from the mold, they could need more time to reach 100% cure, and therefore 100% strength, which can occur over hours or days. Since most parts are not intended for use immediately, this will generally not be a problem.

To provide an assembled mold from mold parts that are securably engaged with respective mold engagement plates, a plurality of stepper motors can be in operational engagement with a plurality of lead screws. In some aspects, the number of stepper motors is 4 and the number of lead screws is 4, however, other arrangements can be used as appropriate for the design. A plurality of guide rods or guide rails can be associated with the mold set up to better ensure that the mold parts are maintained in place during assembly of the mold and de-molding of the substantially cured fabricated part. The guide rails can incorporate a plurality of pins to further secure the mold and associated parts therein.

The stepper motors and associated components can be configured to move the mold parts together at about 0.1 inch/second to about 10 inches/second or at about 1 to about 6 inches/second. Clamping force of the mold parts can be up to about 100,000 psi, with a range generally of from about 1000 to about 15,000 psi. The assembled mold is substantially impermeable to the liquid reactant materials at the seals thereof. It has been determined that when such a mold and screw configuration is used, a high amount of clamping force can be generated with minimal use of components. Other ways to bring the mold parts together include the use of linear actuators or hydraulic/pneumatic cylinders/presses.

In one aspect, the mold plates can be pressed together and the mold assembly—that is, the two mold parts—so as to cause the mold assembly to press against springs at loads of from about 100 to about 1000 pounds. The mold assembly, while pressing against the springs, can cooperate with the distal end of the mixing nozzle to result in insertion of that end into a nozzle entry point that forms an opening into the interior of the mold assembly. The distal end of the nozzle can extend into the interior of the mold assembly from about 0.10 inch to about 2.0 inches. Once the distal end of the mixing nozzle is inserted into the manifold and the mold assembly, the pumps are engaged to cause reactant parts A and B to be communicated from their respective reactant material tanks to the mixing nozzle, followed by incorporation of the mixed parts A and B into the mold assembly. After a period of time determined by the reaction rate of the mixed resin, which can be automatically provided by the control or processing circuitry associated with the injection molding process, the mold assembly is disengaged from the mixing nozzle. Initiation and completion of such disengagement process can be automatic (e.g., activated by the control or processing circuitry) or manual (e.g., activated by a user) or a combination thereof. With the available spring force, disengagement of the distal end of the mixing nozzle can be forced away, thus breaking the plastic sprue that can be present at the point where the mixing nozzle connects with the fabricated part. This spring action movement therefore breaks the connection between the distal end of the nozzle and the part allowing the part to be easily removed from the mold once the molding cycle is complete.

By way of explanation, once the mixed reactant materials cure in the mold, the distal end of the mixing nozzle would normally be "stuck" to the mold/fabricated part combination since the mixed reactant materials in the mixing nozzle are all now solid plastic due to curing. With the spring action provide by the disclosed mechanism, after the reactant material parts cure, the plurality of springs push the mold back away from the mixing nozzle and the mold parts open up. The distal end of the mixing nozzle, that is, the part of the mixing nozzle that delivers the mixed reactant material to the mold through the mixing nozzle insertion point, can now be disengaged from the mold and the fabricated part due to such spring action. In other aspects, the mixing nozzle could be forced away from the fabricated part/mold combination via a solenoid, linear actuator or other suitable system. Yet further, the mixing nozzle could be manually or mechanically twisted until the fabricated part breaks away from the mixing nozzle. Still further, a blade or other sharp mechanism could shear off the plastic between the part and mixing nozzle. In yet another example, ejector pins on the sliding mold part would push the part away from the mixing nozzle. The user can be able to replace the mixing nozzle by hand, or the nozzle can be automatically replaced as discussed elsewhere herein.

Cycle time, that is the number of cycles that occur in a period of time from mold closing to mold opening and is generally different from the cure time, due to the time needed to engage a new mixing nozzle, pump the reactant material parts, fabricate the part, remove the part from the machine, and remove the used mixing nozzle from the reaction injection molding machine. To this end, cycle time can vary according to the size, thickness and complexity of the part being fabricated. In some aspects, the cycle time can be from about 30 seconds to about 60 minutes, or about 5 to about 15 minutes. Yet further, cycle time can be about 1 minute, 5 minutes, 10 minutes, 15 minutes, 20 minutes, 30 minutes, 45 minutes or 60 minutes, where any value can form an upper or lower endpoint as appropriate.

In an exemplary process, the mold parts that are attached to the mold assembly plates are brought together at a spring rate of approximately 300 pounds. The springs can deflect approximately 1 inch and the assembled mold can engage with the distal end of the mixing nozzle. The mold assembly plates can continue to push together, but can now be pushing against a stop on the reaction injection molding machine, wherein the stop substantially prevents damage to the springs. A clamping force is applied to seal the mold parts together, where this force can be up to about 10,000 psi or greater, in some circumstances. The mixed resin can be injected into the assembled mold via the distal end of the mixing nozzle. The resin can be allowed to set up until gelling is substantially completed and the part is in a semi-rigid state, which can be when the resin is about 50% or 60% or 70% of the way through the curing process, wherein the clamping pressure can be lessened so as to allow the mold assembly to push away from the distal end of the mixing nozzle so as to break the attachment between the nozzle and the partially or fully cured resin in the interior of the mold assembly. Once the resin is substantially cured, the mold can be opened and the part can be ejected. The cycle can repeat.

Operation of the reaction injection molding machine can be facilitated with indicator lighting on the exterior and/or interior thereof. For example, signals can be activated by switches to provide a user with information regarding one or more of the following: door close status; injection molding nozzle presence and whether the nozzle is properly fitted on the reaction injection molding machine; reactant tanks load and engagement status; power status, etc.

Yet further, operation of the reaction injection molding machine can be enhanced by the addition of lighting on the interior of the housing. Such lighting can also enhance the aesthetics of the machine. Accordingly, the reaction injection molding machine can be configured with, for example, LED lighting.

To align with the desktop operation of the disclosed molding technology, the reaction injection molding machine in one aspect can be operated on standard 120AC, 60 Hz power.

In some aspects, the reaction injection molding machine can incorporate pre-set operations within the firmware associated therewith so as to allow the molds and reactant materials and use thereof to be processed substantially without the need for external communications. Such self-sustained operation can be useful when the reaction injection molding machine is operated in a location where Internet access is not available. The operations of the reaction injection molding machine when no Internet is available can be stored within the reaction injection molding machine. Moreover, the reaction injection molding machine can also suitably incorporate communication ports, for example USB ports, or the like so as to allow the machine to use downloaded operational instructions. Such instructions can also be incorporated into the reaction injection molding machine when it is connected to the internet for use during times when the internet is not available.

In further aspects, the disclosed technology comprises a set of software instructions provided to the control or processing circuitry of the reaction injection molding machine that regulates at least the type and amount of each of the reactant materials including whether either or both of the reactant materials are in compliance with authorized reactant material components), the flow rate of each of the reactant materials into the mold, the presence or absence of the mold and proper connection thereof with the reaction injection molding machine, the proper closing/seal of the mold parts, the temperature of the mold and reactant materials prior to and during part formation, the time the molds are opened, the pressure at which the molds are opened and closed, the automatic replacement of the mixing nozzle (optional), and the ejection of the fabricated part from the mold. Periodic firmware and/or software updates for the control or processing circuitry of the reaction injection molding machine can also be provided via available communications methodologies.

Information about the conditions of operation of the reaction injection molding machine can be provided to the user in real-time or substantially in real time. For example, such information can be provided to the user in "dashboard form" on a mobile device or computer, along with other information such as mold type and identification, run number, reactant material details (lot number, type etc), external conditions (ambient temperature and humidity, etc.) and the like. Process information can also be stored for use at a later date.

Yet further, Bluetooth®, cellular and other types of communications can allow the reaction injection molding machine to communicate directly with a mobile device or a computer even when internet access is not available. In this regard, operations of the reaction injection molding machine can be controlled from the mobile device or computer via applications ("apps") or desktop installed software. Information generated by the reaction injection molding machine can further be stored in the mobile device or computer, and such information can later be uploaded to the cloud when internet access is again available.

Process information can also be provided to a cloud server in real time or substantially real time to allow a third party to observe and manage the operation of the reaction injection molding machine from a remote location.

In some aspects, the reaction injection molding machine can be configured to allow replacement of operational componentry (e.g., components, circuitry or other parts) while the reaction injection molding machine is deployed by the user. During extended use, it is possible that the tank engagement, pumping, molding componentry or other parts of the reaction injection molding machine will fully or partially fail. To facilitate repair of the reaction injection molding machine by a user, one or more aspects of the reaction injection molding machine componentry can be configured to be individually removable. In other words, one or more of the reactant materials tank engagement, pumping system (tubing, pumps and/or step motors), and mold supports and related componentry can be engageably removable from the reaction injection molding machine. Such modular configuration allows the user to be sent a kit associated with the part(s) of the reaction injection molding machine that are not operational whereby the user can disengage the component to be replaced from the reaction injection molding machine and to replace that failed component with a functional component so that the reaction injection molding machine can again be utilized. Upon replacement of the component, the control or processing circuitry associated with the reaction injection molding machine can be configured to conduct a validation procedure to ensure that the component is replaced correctly. The component that is replaced can incorporate identification to allow the component to be tracked. In relation to this aspect, the disclosed technology further provides a method for repairing a reaction injection molding machine of the present disclosure.

The articles or parts fabricated herein are suitable for use in any use in which thermosetting polymeric parts made in traditional processes can be used. Accordingly, resin selection will generally define acceptable use cases for the resulting parts. When the resulting articles or parts are biocompatible or otherwise non-reactive or non-allergenic to humans or animals, medical devices can be generated, including implantable medical components. When food grade plastics are generated from the thermoplastic resins, the articles or can be used for food preparation, shipping or storage.

The format and operation of the reaction injection molding machines and methods of the present disclosure are particularly suitable for rapid prototyping. As would be recognized, "rapid prototyping" is used to create a three-dimensional model of a part or product. In addition to providing 3D visualization for digitally rendered items, rapid prototyping can be used to test the efficiency of a part or product design before it is manufactured in larger quantities. Such testing can be useful when evaluating the shape or design of an article or part or collection of article or parts assembled into a product.

Yet further, the reaction injection molding machines and methods herein can beneficially be used to generate parts or articles on an "on demand" basis, such as in substantially real time. Moreover, when used in conjunction with the 3D printed molds as discussed herein, customized articles and parts can generated exceedingly quickly vs. prior art methods.

While such customization can be useful in a variety of settings, such substantially real time article or part generation can be used to generate medical equipment intended for use by a patient in accordance to specifications associated with the patient's medical condition. Such "patient-matched" devices can include instrumentation (e.g., guides to assist with proper surgical placement of a device), implants (e.g., joints, stents, scaffoldings), and external devices (e.g., prosthesis, supports/braces/casts). Patient-matched (or patient-specific) devices are created specifically for the patient based on individual features, such as anatomy. They can be based on a template model that is matched to a patient using medical imaging. Patient-matching can be accomplished by techniques such as scaling of the device using one or more anatomic features from patient data.

Such medical devices can also be generated in small runs, thus allowing devices to be generated for a patient population of a relatively small size. For example, runs of less than about 5000 or less than about 1000 or less than about 500 or less than about 100 devices can be made cost effectively using the reaction injection molding machines and methods herein. As a result, it is expected that medical costs can be reduced when hospitals or other medical facilities, etc. adopt the disclosed machines and methods.

Referring to FIG. 1, presented is a front view of a reaction injection molding machine 100 of the present disclosure that comprises a housing 105 that includes a door 110 for access into the interior of machine 100. As shown, the door 110 can have a front door aspect 110a and top door aspect 110b, to facilitate frontal access into machine 100 or full access into the interior therein. The door 110 can also include a latch 110c to facilitate opening and closing of door 110. A door sensor such as, e.g., a switch or proximity sensor can be included to detect door closure. Left hinges 115a, 115b and right hinges 120a and 120b are shown in FIG. 1. The hinges 115 and 120 connect the door panels together and allow for jointed motion of the front and top door aspects 110a and 110b. The door 110 can be openably attached to housing 105 by hinges as illustrated in FIG. 2, but as would be appreciated other forms of hinging can be used to allow access into machine 100.

Further in FIG. 1, reactant materials tanks 125, 130, 135 and 140 are shown that, in the configuration shown, can comprise two reactant materials tanks of part A (e.g., tanks 125 and 130), and two reactant materials tanks of part B (e.g., tanks 135 and 140). Other tank positions and/or combinations are contemplated. Insertion and removal of the respective reactant materials tanks 125-140 can be facilitated by latching mechanisms 145, 150, 155 and 160, respectively. Each reactant materials tank can, independently, be released from engagement with a respective reactant material tank engagement port (not shown) by depressing or pulling the mechanisms 145, 150, 155 and 160. A fan 165 can be incorporated into housing 105, with an exemplary placement shown, although other placements of fan 165 are contemplated. Edges of the housing 105 can be chamfered, as shown, for example, by corner 170, and transport of machine 100 can be facilitated by indentations in the housing 105 as shown by, for example, 175a, 175b and 175c (see FIG. 3), and 175d (see FIG. 2).

Figure 2:
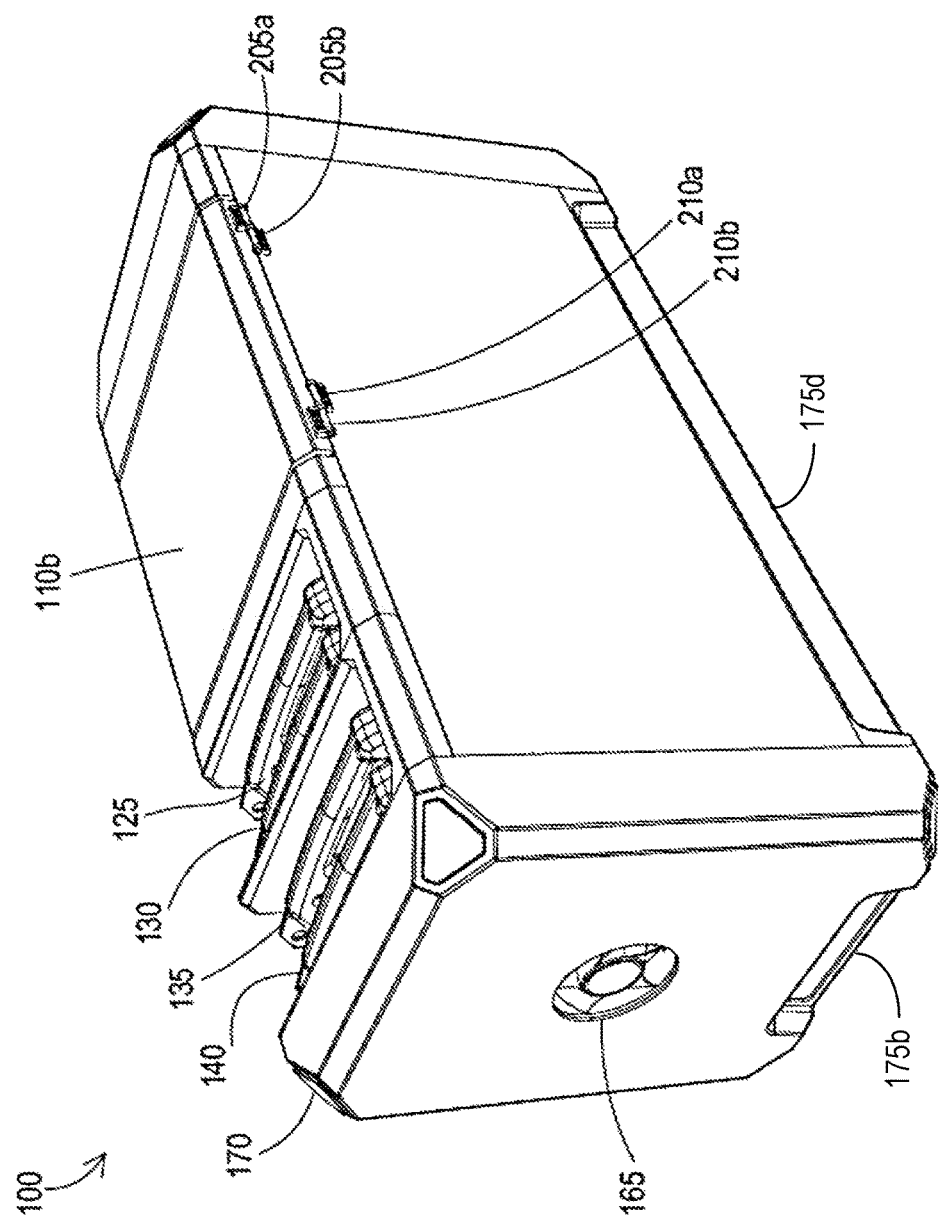

FIG. 2 shows a rear view of the reaction injection molding machine 100 of the present disclosure. Top door aspect 110b of door 110 is shown attached to housing 105 by left hinges 205a, 205b and right hinges 210a and 210b. Again, other door attachment methods are contemplated.

Figure 3:
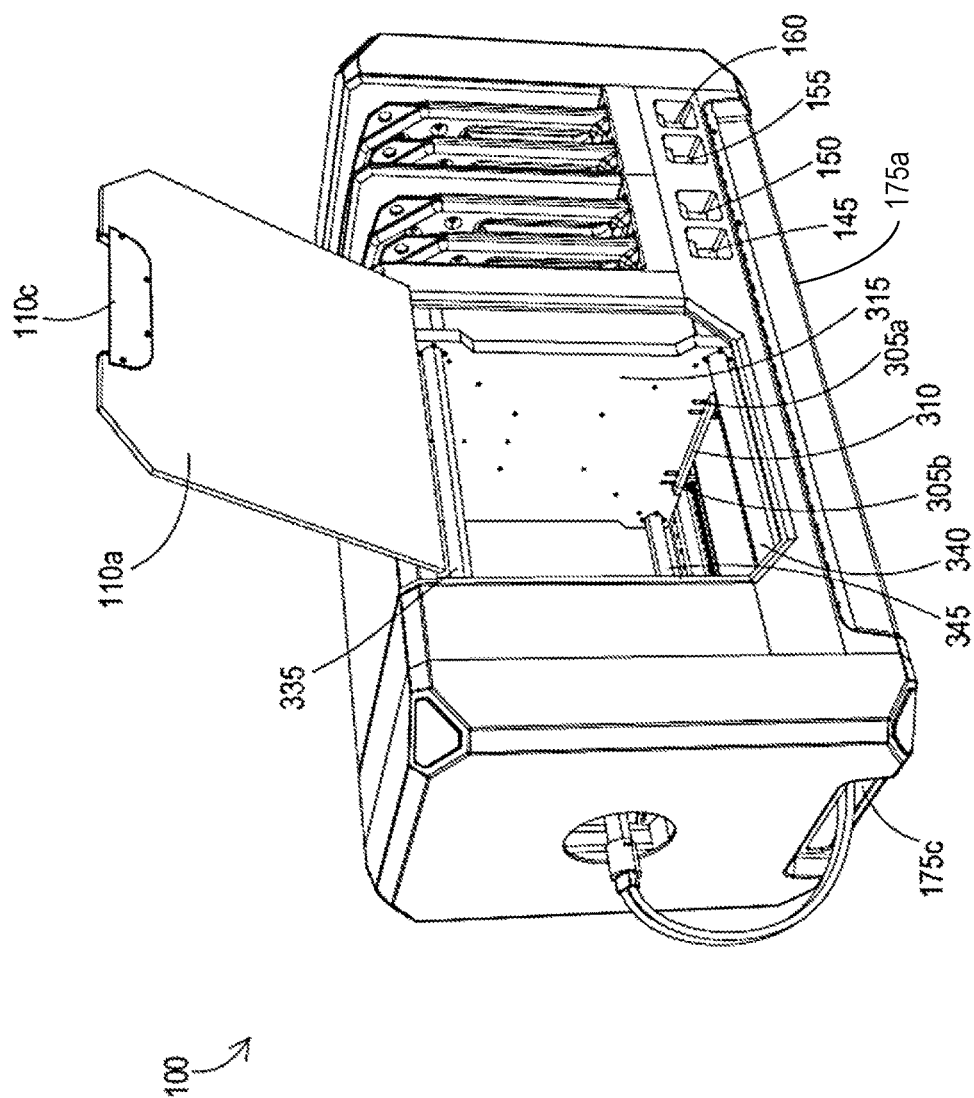

FIG. 3 illustrates another view of the reaction injection molding machine 100 of the present disclosure wherein front door aspect 110a is open to allow access into the interior of the housing 105 via door latch 110c. First mold guide pair 305a and 305b are mounted on a rail 310 that is securely attachable with or to a first side of first mold engagement plate 315. Not shown in FIG. 3 is a second mold guide pair 320a and 320b and second rail 325 (see FIG. 7) that are securely attachable with an interior side of a second mold engagement plate 330. A plurality of lead screws 335, 340, 345 and 350 (see FIG. 4) are operably engageable with the molding engagement componentry (e.g., 305a, 305b, 310, 315, 320a, 320b, 325 and 330), as well as a plurality of stepper motors 435, 440, 445 and 450 (see FIG. 4).

Figure 4:
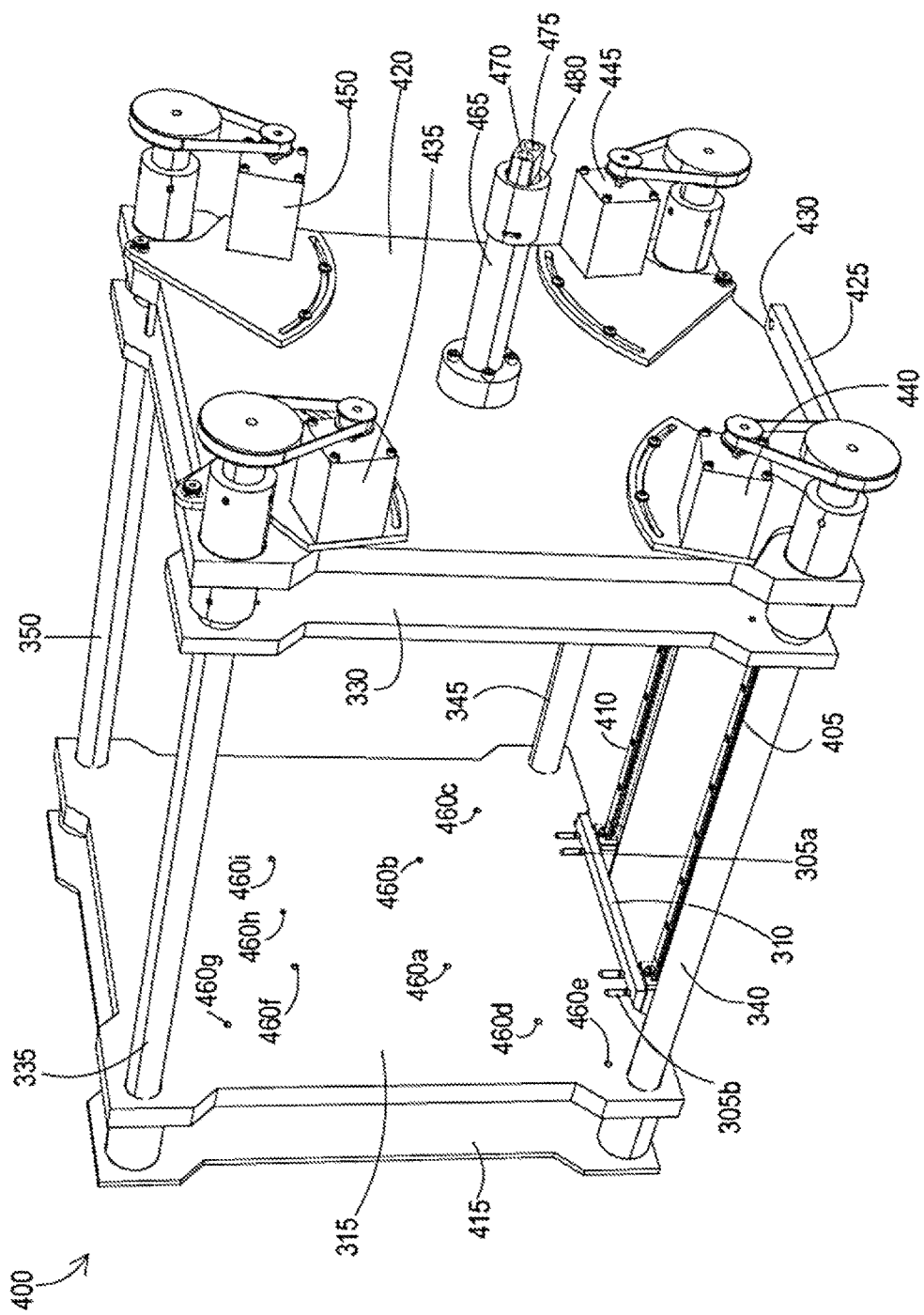
FIGS. 4 through 7 provide various views of examples of componentry of the reaction injection molding machine of FIGS. 1-3, in accordance with various aspects of the present disclosure.

Turning now to FIG. 4, an example of a mold support framework 400 of the reaction injection molding machine 100 of the present disclosure is shown (note that the perspective is flipped from that of FIG. 3). In this regard, FIG. 4 shows mold guides 305a and 305b engaged with rail 310, wherein rail 310 is connectably engaged with guide rails 405 and 410. While a configuration with only two guide rails 405 and 410 is shown, other guide rail configurations are contemplated. The guide rails 405 and 410 can include coatings and/or lubrication to facilitate smooth movement of the first mold engagement plate 315 along the guide rails.

FIG. 4 further illustrates complementary first and second mold support plates 415 and 420 at opposite ends of the mold support framework 400, wherein securing rail 425 is shown to allow mold support framework 400 to be removably attachable to the housing 105 via at least one screw hole 430, although other attachment arrangements are contemplated. For example, securing rail 425 can extend along the bottom of the mold support framework 400 between the first and second mold support plates 415 and 420 and can include holes or other openings at its corners for attachment to the housing 105.

FIG. 4 further illustrates an exemplary arrangement for movement of mold engagement plate 315 toward mold engagement plate 330 during a molding operation. In this regard, the plurality of stepper motors 435, 440, 445, and 450 are removably attached to an outer side of second mold support plate 420. The plurality of stepper motors 435, 440, 445, and 450 are operationally engaged with respective lead screws 335, 340, 345, and 350. In the example of FIG. 4, the stepper motors 435, 440, 445, and 450 are engaged with the lead screws 335, 340, 345, and 350 through belts and pulleys. By using a larger pulley on the lead screws, a finer step resolution can be achieved. Pulley teeth and belt notches can be used to ensure synchronization of the motors 435, 440, 445, and 450 and lead screws 335, 340, 345, and 350. Belt tension can be adjusted through pivot plates supporting the stepper motors 435, 440, 445, and 450. The pivot plates can be secured in position against the second mold support plate 420 using mounting screws or bolts. Other configurations such as gears can also be used. In use, operation of the stepper motors 435, 440, 445, and 450 will cause the first and second mold engagement plates 315 and 330 to be brought together, thereby bringing the respective mold parts (see FIGS. 8A-8C) together so as to generate an assembled mold.

FIG. 4 also illustrates a plurality of mold support engagements 460, here denoted 460a, 460b, 460c, 460d, 460e, 460f, 460g, 460h, and 460i, where fewer or more of such support engagements can be incorporated in each of the first and second mold engagement plates 315 and 330. Such mold support engagements 460 can be sized to fit on corresponding fasteners, for example bolts, screws, pins, etc., that can be fixed to first and second mold engagement plates 315 and 330. The mold support engagements 460 and any associated bolts or other appropriate fasteners can be used to assist in attaching the mold parts (not shown) to the first and second mold engagement plates 315 and 330. Different numbers and arrangements of mold support engagements 460 and associated fasteners can be used for different mold configurations. Thus, an assortment of mold engagement supports 460 can be incorporated in the first and second mold engagement plates 315 and 330. Molds fabricated for use in the present disclosure can be configured to incorporate appropriate configurations of complementary fasteners to allow mating with one or a plurality of mold support engagements 460 located on first and second mold engagement plates 315 and 330, as appropriate.

FIG. 4 also illustrates injection molding manifold 465 having injection molding manifold fluid communication ports 470 and 475, as will be discussed later in relation to FIG. 7.

Figure 5:
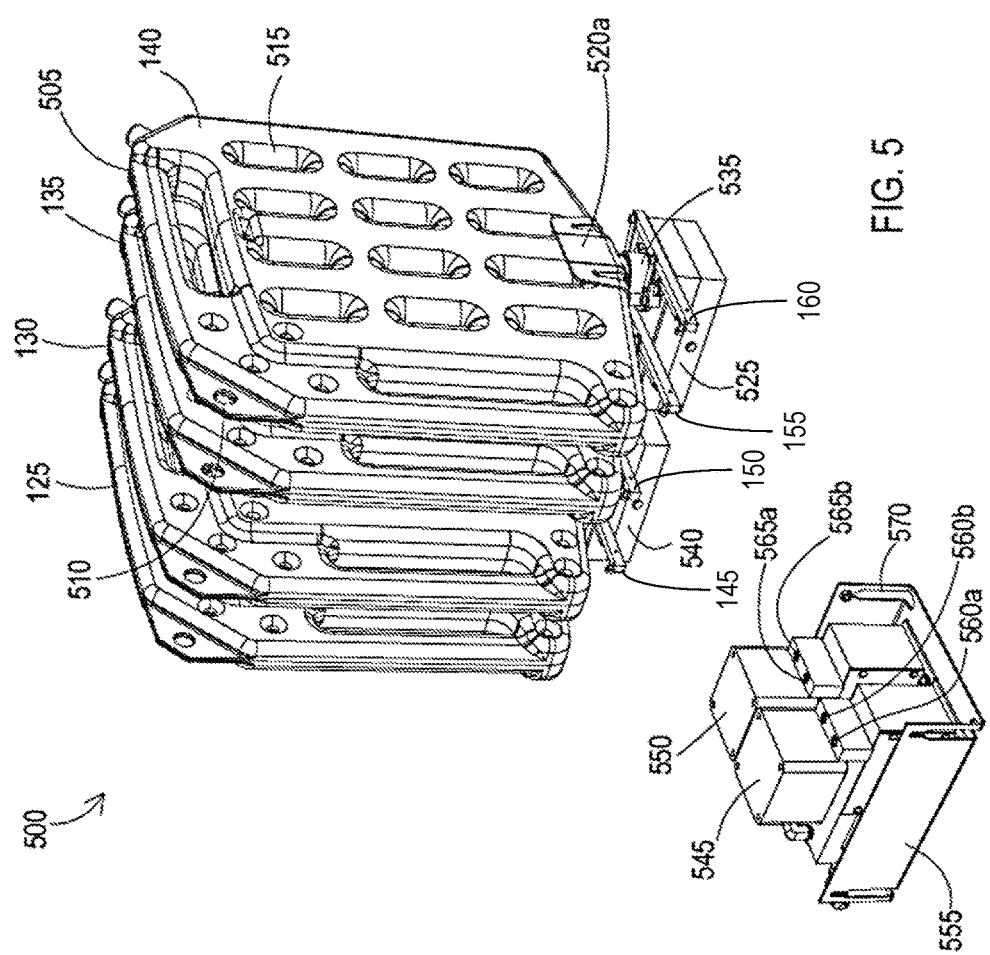

Referring next to FIG. 5, a callout 500 of an arrangement of the plurality of reactant materials tanks 125, 130, 135, and 140 is illustrated, whereby certain features thereof have been illustrated in exemplary fashion. The reactant materials tanks 125, 130, 135, and 140 can incorporate a number of features to facilitate their use. For example, as shown with respect to reactant materials tank 140, a carry handle 505 can be integrated into the container. A second handle can be included as shown to aid in installation of the reactant materials tank. Yet further, a hole 510 can be incorporated so as to allow the reactant material tank to be hung on a peg or the like (not shown) when not installed in the reaction injection molding machine 100.

As discussed in detail elsewhere herein, each reactant material tank can incorporate one or a plurality of kiss-offs 515 to enhance the overall strength of the reactant materials tanks 125, 130, 135, and 140 when reactant material is being removed therefrom. FIG. 5 illustrates twelve kiss offs extending through reactant material tank 140, however, more or fewer, or larger or smaller, kiss-off configurations can be used. As previously discussed, the kiss-offs 515 can provide a tortuous path for the resin to remain mixed. For example, the resin can be manually mixed by shaking the reactant materials tank. The illustrated reactant material tanks 125, 130, 135, and 140 can be sized to incorporate about two gallons of reactant material in each tank, however, larger or smaller capacity tanks can be used, as long as the small footprint aspects of the reaction injection molding machine of the present disclosure is appropriately enabled.

Still with respect to FIG. 5, key-way 520 (shown as ½ of the component 520a) is incorporated on engagement station 525 so as to ensure that the right tanks are properly engaged. In this regard, to ensure that part A is not inserted into the part B engagement ports (and vice versa) key-way 520 is configurable to lock-out (or prevent insertion of) the wrong raw materials tanks, so as to prevent the reaction injection molding machine 100 from being disabled as a result of incorrect placement of raw materials into the respective engagement ports. For example, the key-way 520 can comprise one or more open or covered slots (or grooves) located on one or both sides that allow the one or more keys (e.g., tabs or protrusions) on one or more sides of the reactant materials tanks to slide into during installation of the corresponding reactant materials tank. By utilizing different slot and key configurations, wrong reactant materials tank can be prevented from being installed. For instance, type A reactant materials tanks can include a single key that aligns with a single slot in the type A key-ways and type B reactant materials tanks can include two keys that align with two offset slots in the type B key-ways. By providing different number and alignments of the keys and slots, lockouts can be provided to avoid installation of the wrong reactant materials tank in the wrong engagement port.

Figure 6A:
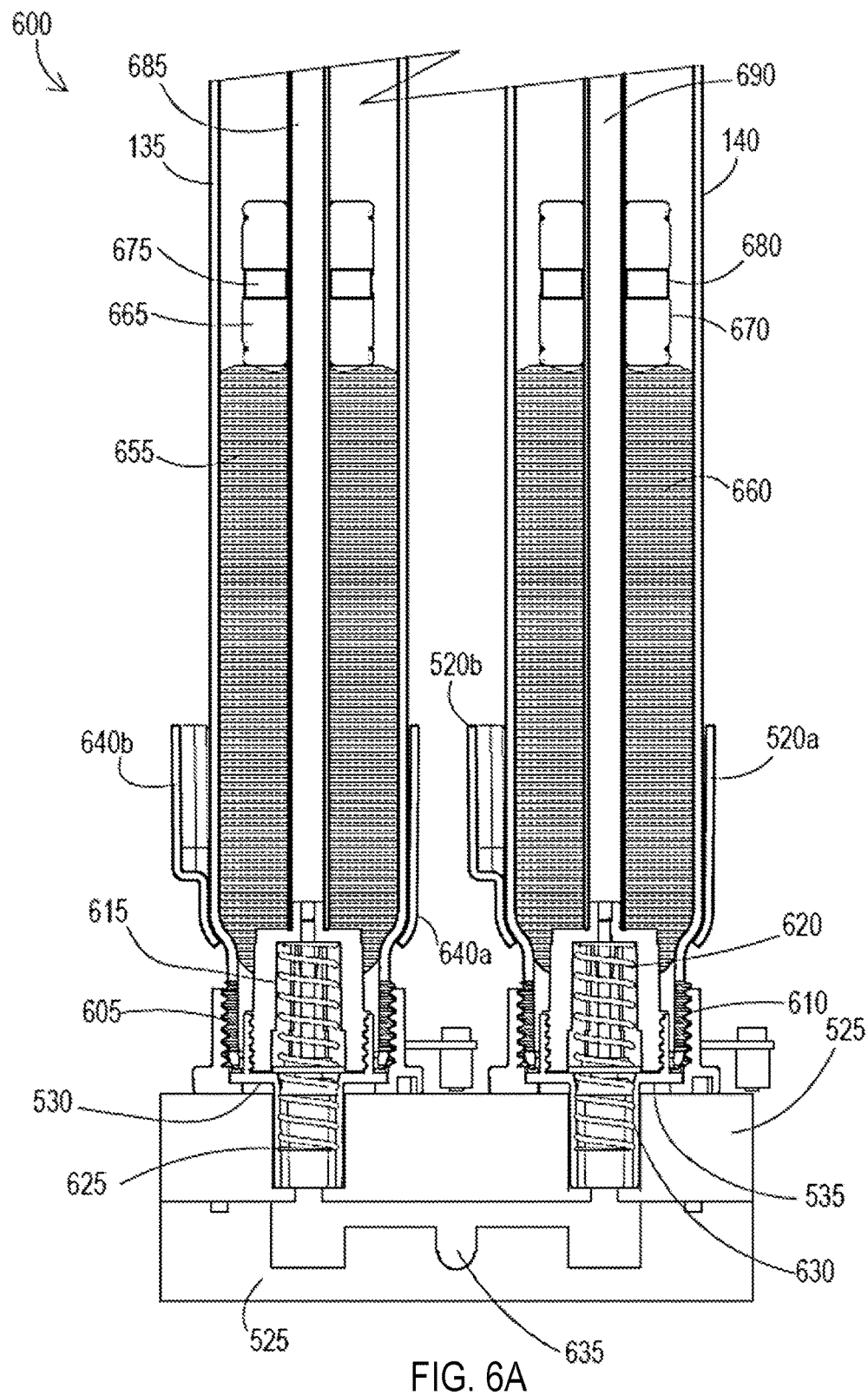

The mouths (not shown) of reactant materials tanks 135 and 140 can each, independently, be engaged with a reactant material tank engagement station 525 by way of respective engagement ports 530 and 535 (see FIG. 6A). Reactant materials tanks 125 and 130 can similarly engage with engagement station 540. Generally, sealed engagement of the reactant materials tanks 125-140 with the engagements ports can by way of a check valve, as discussed elsewhere herein. Insertion and removal of the respective reactant materials tanks 125, 130, 135 and 140 can be facilitated by mechanical linkages of latching mechanisms 145, 150, 155 and 160, respectively. Each reactant materials tank can, independently, be released from engagement with a respective reactant material tank engagement port 530 or 535 by depressing or pulling the latching mechanisms 145, 150, 155 and 160. The linear movement of depressing a button or pulling a handle of the latching mechanisms can be translated into rotational movement of a locking mechanism by the mechanical linkages to allow removal of the installed reactant materials tank, to allowing insertion of a reactant materials tank. Release of the latching mechanism after insertion can allow spring action to return the locking mechanism to a locked position and secure the mouth of the reactant materials tank in the engagement port.

When appropriately engaged in the respective engagement ports 530 and 535 (see FIG. 6A), the reactive materials in tanks 135 and/or 140 can be introduced into a first reactive material fluid stream by way of one or a plurality of pumps. Similarly, the reactive materials in tanks 125 and 130 can be introduced into a second reactive material fluid stream using one or a plurality of pumps. An exemplary pump arrangement is illustrated in FIG. 5 as two pumps 545 and 550 that are enclosed within the pumping station 555. Piston style pumps can be used. Varying the speed can adjust volume of reactant supplied by the pump and/or discharge pressure. When two pumps are used, as here, the first and second reactant material fluid streams can be simultaneously pumped at different rates in accordance with the parameters of the associated molding operation. In some aspects, only one of the reactive material tanks of parts A and B will be used at a time. This can be accomplished through control of the check valves, or through other isolation valves, associated with the engagement stations 525 and 540. When a reactant materials tank 125-140 is empty (as indicated by sensors as discussed hereinafter), that reactant materials tank can be isolated from the corresponding reactive material fluid stream and the second tank can become operable.

Further by way of illustration, pumping station 555 incorporates fluid communication ports 560a and 560b and 565a and 565b through which reactant material can flow from the respective tanks 135 and 140, when pumping station 555 is engaged with the reactant material engagement station 525. A secure fit between pumping station 555 and reactant material engagement station 525 can be facilitated by a friction fit provided by indentations in one or more of 525 and 555, such as shown by 570. Other forms of secure fit are contemplated. Reactive material engagement station 540 can similarly be securely engaged with pumping station 555.

FIG. 6A shows details of an exemplary cross-sectional view 600 of a configuration of two reactant material tanks, for example, 135 and 140, when loaded into reactant material engagement station 525. Threaded mouths 605 and 610 are shown on tanks 135 and 140, respectively. Prior to use, or for storage, reactant materials tanks 135 and 140 can be sealed via a threaded cap (not shown) or the like. Other forms of closures are contemplated.

As shown in FIG. 6A, each of raw materials tanks 135 and 140 incorporate check valves in the mouths thereof, as shown by 615 and 620, respectively. Each of engagement ports 530 and 535 incorporate check valves 625 and 630 therein. By way of example, when reactant materials tank 140 is engaged with engagement port 535, such engagement will cause check valves 620 and 630 to open by way of spring action to allow reactant material to flow from tank 140 into fluid flow chamber 635 in engagement station 525. The check valves 620 and 630 can act against each other to facilitate reactant flow into the reactant material fluid stream. The latching mechanism 160 (FIG. 5) can lock the threaded mouth 610 of the reactant materials tank 140 in position in the engagement port 535. When the reactant materials tank 140 is removed from the engagement port 535, both check valves 620 and 630 automatically close preventing any loss or leakage from the reactant materials tank 140 during removal and sealing the system when the tank is not present.

Figure 6B:
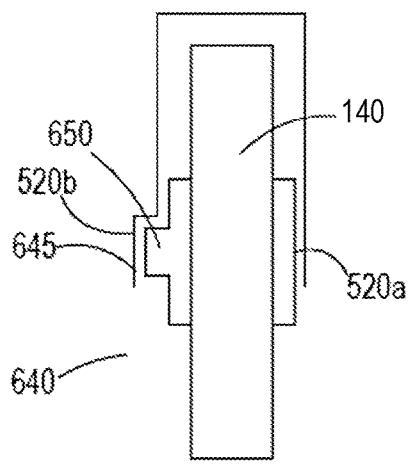
Figure 6C:
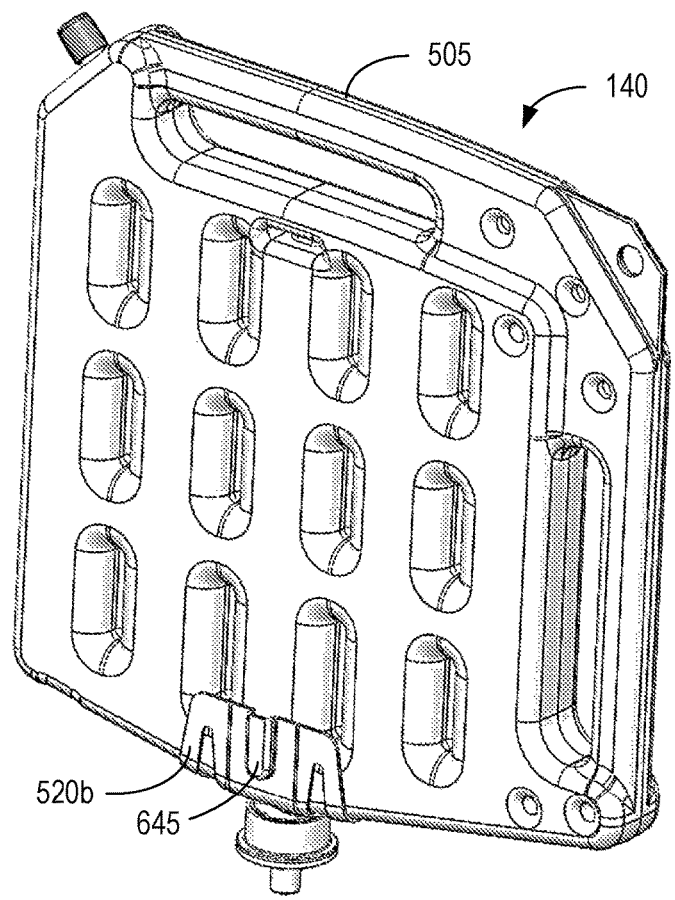

Key-way 520 and 640 are shown in cross-section as components 520a, 640a, 520b and 640b in FIG. 6A. Referring to FIG. 6B, the example of key-way 520 will be described. In this regard, key-way 520 is shown as a top-cross section that secures a bottom-portion of tank 140. An interior portion of key-way 520 can incorporate a detent 645 (e.g., slot or groove) that is configured to mate with a complementary protrusion 650 (e.g., key or tab). Only tanks specifically configured with detents configured to mate with complementary protrusions will be engageable so as to ensure that part A tanks are not placed into part B engagement ports, and vice versa. In one implementation, among others, part A reactant materials tanks can include one key centered on the mouth area of the reactant materials tank and part B reactant materials tanks can include two parallel keys with the space between the keys centered on the mouth area of the reactant materials tank. FIG. 6C is a perspective view of reactant materials tank 140 inserted in key-way 520 including a single detent (or covered groove) 645.

Turning back to FIG. 6A, tanks 135 and 140 are shown partially filled with raw material 655 and 660, respectively. Floats 665 and 670 are shown proximal to an upper surface of the raw material 655 and 660, respectively. Floats 665 and 670 are configurable with sensors (e.g., a plurality of Hall Effect sensors), here magnets 675 and 680, moveably configured on support columns 685 and 690, where the sensors are operably engaged with a complementary sensor signal receiver (not shown) that provides information about the fill level of each of the tanks in use. One or more sensors, for example Hall Effect sensors, can read the magnetic field corresponding to a known distance the float is from the sensor(s) to generate information about the amount of resin left in the tank. A plurality of Hall Effect sensors can be vertically aligned along the side of a reactant materials tank to detect the position of the magnetic float inside the reactant materials tank. In some implementations, a combination of the highest magnetic readings can be used to determine the reactant level in the tank. For instance, the three highest readings taken from a stack of Hall Effect sensors adjacent to the reactant materials tank can be used to determine the amount (or percent) resin remaining in the tank.

Figure 7:
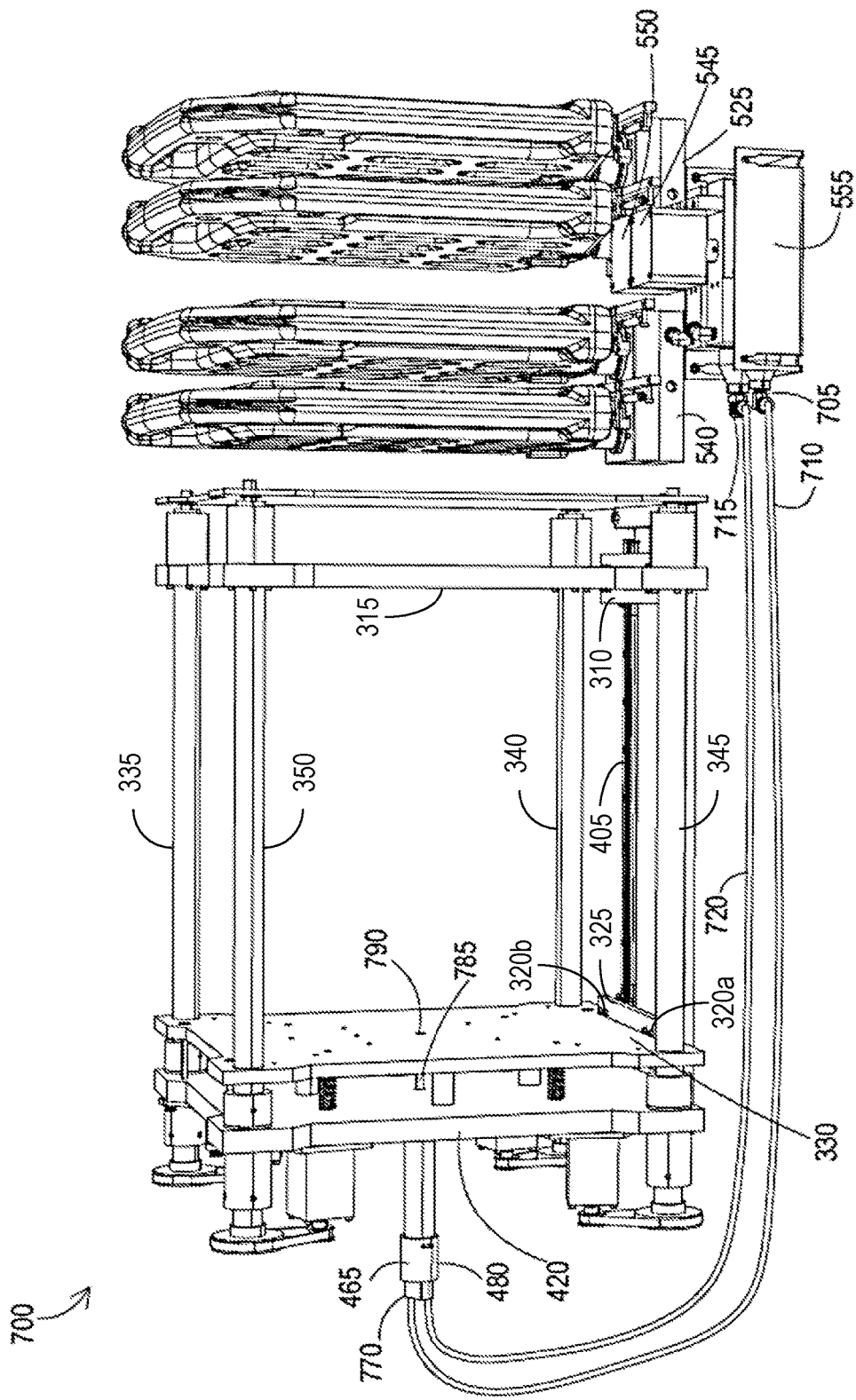

Now with respect to FIG. 7, is a view of the molding assembly 700 of the reaction injection molding machine 100 with the housing 105 removed. A first fluid connection port 705 is sealably engagable with a first reactant materials fluid stream via a first hose 710. A second fluid connection port 715 is sealably engageable with a second reactant materials fluid stream via a second hose 720. Hoses 710 and 720 are sealingly engageable with connector port 770 which is operationally engaged via an injection molding manifold 765 with the proximal end 780 (see FIG. 8A) of injection molding nozzle 775 (see FIG. 8A). The injection molding nozzle 775 extends through mold support plate 420 with the distal end 785 in the space defined by the distance between plates 420 and 330, and aligned with a chamber opening 790 through mold support 330.

Figure 8A:
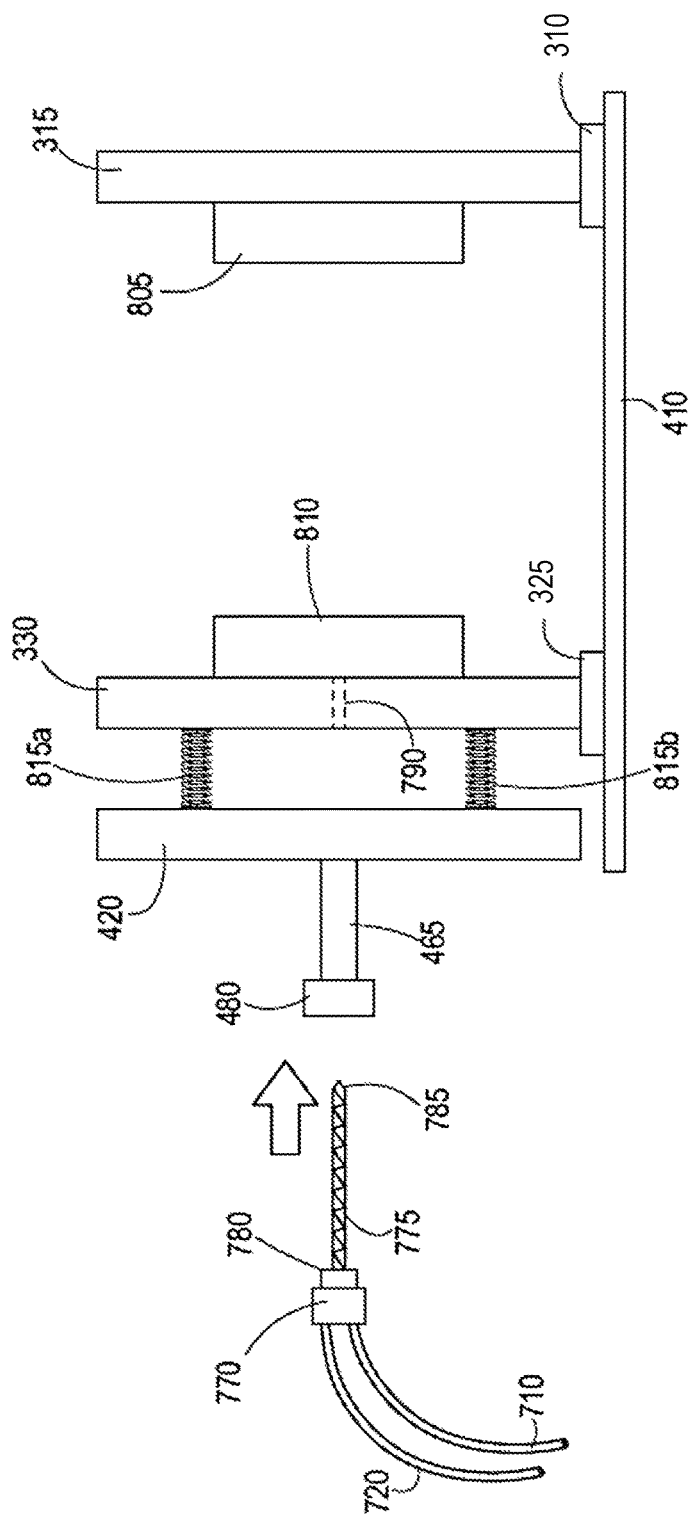
FIGS. 8A through 8D are graphical representations illustrating an example of the operation of the reaction injection molding machine of FIGS. 1-7, in accordance with various aspects of the present disclosure.

FIGS. 8A-8D illustrate an exemplary operation of the reaction injection molding machine 100 of the present disclosure. FIG. 8A shows a configuration where a first mold part 805 and second mold part 810 are removably mounted on mold engagement plates 315 and 330, respectively. On an interior side of the mold engagement plate 330 (that is, the side proximal to mold support plate 420), springs 815a and 815b are operationally engaged with mold engagement plate 330 and mold support plate 420. Second mold part 810 includes an opening (not shown) in operational engagement with chamber opening 790 disposed through mold support plate 330. The springs 815 can comprise two or more springs 815. For example, two, four or other combination of springs 815 can be distributed about the chamber opening 790 to provide even separation pressure to disengage the injection molding nozzle 775 from the second mold part 810 and mold engagement plate 330.

FIG. 8A also illustrates a configuration for engagement of mixing nozzle 775. Mixing nozzle 775 is connectably engaged with connector port 770 by securing of a proximal end 780 of the mixing nozzle 775 using, e.g., a bayonet-type attachment. Once securely attached to connector port 770, the distal end 785 of the mixing nozzle 775 is ready for placement into mixing manifold 465 by engagement of connector port 770 in manifold port 480. With the mixing nozzle attached to the connector port 770, there will be fluid engagement with the part A and part B reactant material tanks via hoses 710 and 720 and pumps 545 and 550 (see FIG. 7). When installed in the injection molding manifold 465, the injection molding nozzle 775 extends through mold support plate 420 with the distal end 785 in the space defined by the distance between plates 420 and 330, and aligned with the chamber opening 790 through mold support 330 as shown in FIG. 8B.

Figure 8B:
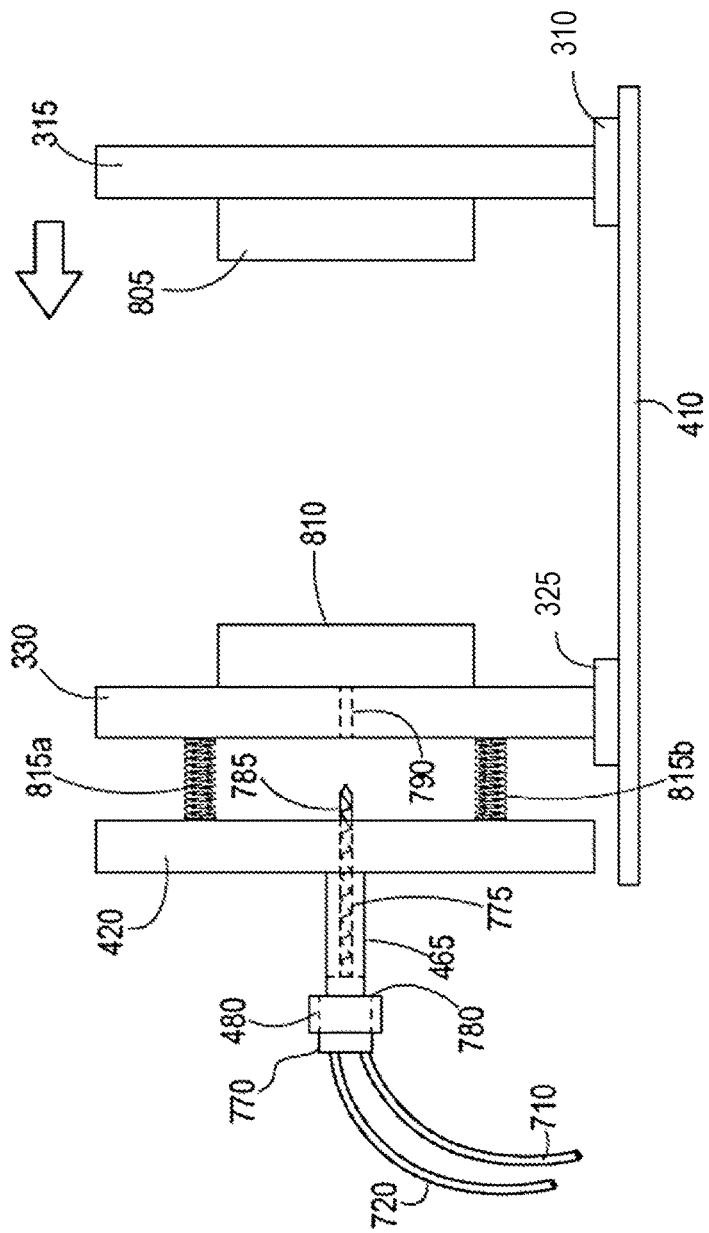

Referring to FIG. 8B, movement between mold engagement plates 315 and 330 is shown, where advancement is by way of the lead screws 335, 340, 345, and 350 and stepper motors 435, 440, 445, and 450 (see FIG. 4). Control of the stepper motors 435-450 advances the mold engagement plate 315 and the first mold part 805 along the guide rails 405 and 410 as indicated by the arrow. Encoders on each of the lead screws or stepper motors can be used to provide feedback that allows for precise determination of the location of the corners of the mold engagement plate 315, and thus the relationship between the mating faces of the first and second mold part 805 and 810. As the mold engagement plates 315 and 330 move closer together, the mating faces of the mold parts 805 and 810 contact to form the assembled mold. After initial contact between the mold parts, the lead screws continue to move the mold engagement plate 315 in the indicated direction, thereby moving engagement plate 330 along the guide rails 405 and 410, and compressing the springs 815 between the mold engagement plate 330 and mold support plate 420. As the springs 815 are compressed, the distal end 785 of the mixing nozzle 775 moves through the chamber opening 790 and into a corresponding opening in the second mold part 810 as shown in FIG. 8C.

Figure 8C:
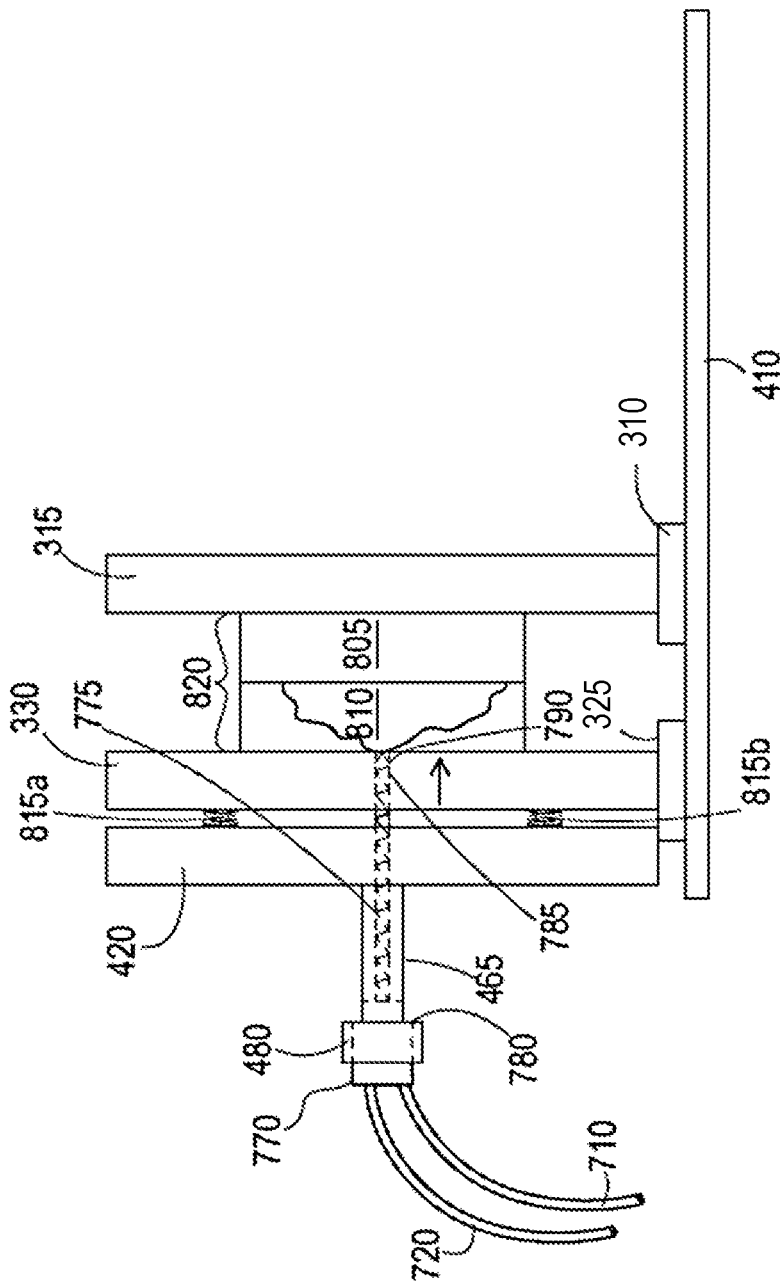

Referring to FIG. 8C, the first mold part 805 and second mold part 810 are brought together to sealingly engage to form an assembled mold 820 suitable for injection molding. The path defined by the chamber opening 790 through mold support 330 and up to second mold part 810 is configured to allow at least a portion of mixing nozzle distal end 785 to penetrate the outer surface of the second mold part 810 so as to allow introduction of injection molding raw materials (e.g., reactant materials or resins) after being mixed in mixing nozzle 775 by way of distal end 785. The pumps 545 and 550 (see FIG. 7) can control the injection volume and pressure of the reactant materials supplied to the assembled mold 820. After injection of the reactant materials, the mold parts 805 and 810 are maintained in position to allow for curing before disassembly and extraction of the molded part.

Figure 8D:
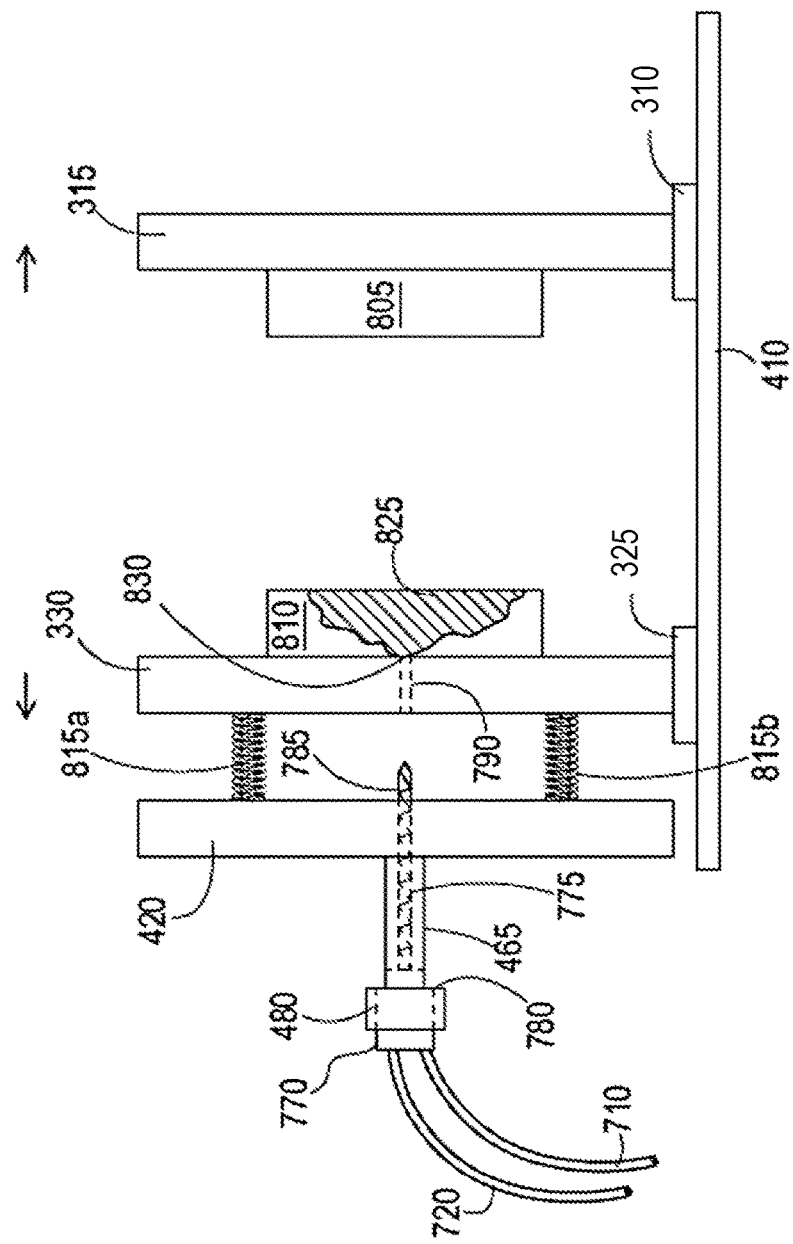

FIG. 8D shows a configuration after the raw materials have been introduced into mold 820, and at least some curing has taken place. The stepper motors 435, 440, 445, and 450 can reverse the rotational direction of the lead screws 335, 340, 345, and 350 to pull the mold engagement plate 315 and first mold part 805 away from the second mold part 810. As the mold engagement plate 315 is moved back, the springs 815 force the other mold engagement plate 330 to move in the same direction. The spring force can separate the distal end 785 of the mixing nozzle 775 to separate from the molded part in the assembled mold. As the mold engagement plate 330 moves, the springs 815 begin to decompress and apply less pressure until a stopping point is reached. At that point, the lead screws 335-350 continue to move the first mold part 805 away from the second mold part 810. One or more mechanical stops can be provided to prevent further movement of the mold engagement plate 330 and the second mold part 810. For example, pins can be mounted to extend through openings in the mold engagement plate 315 and contact the other mold engagement plate 330 to prevent movement beyond that point. The partially cured or fully cured part 825 (shown in partial) will be disengageable from second mold part 810 after breaking the sprue 830 by the force applied by springs 815a and 815b, or the sprue 830 can be cut to allow the partially or fully cured molded part 825 to be removeable from the first mold part 810.

Figure 9:
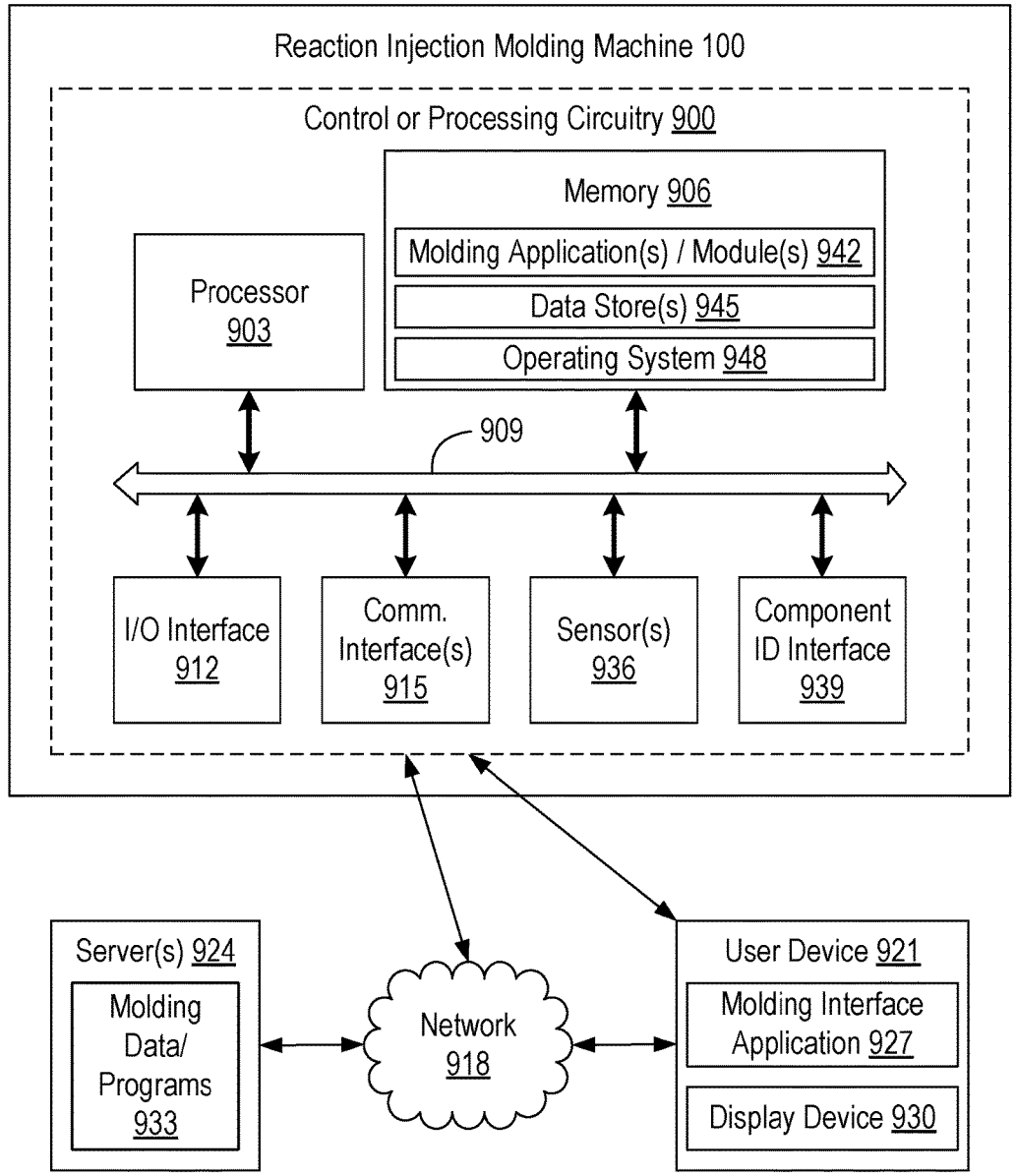
FIG. 9 is a schematic block diagram illustrating an example of control or processing circuitry of the reaction injection molding machine of FIGS. 1-7, in accordance with various aspects of the present disclosure.

Referring next to FIG. 9, shown is an example of the control or processing circuitry 900 of a reaction injection molding machine 100. The control or processing circuitry 900 can include at least one processor circuit, for example, having a processor 903 and a memory 906, both of which are coupled to a local interface 909. The local interface 909 can comprise, for example, a data bus with an accompanying address/control bus or other bus structure as can be appreciated. An input/output (I/O) interface 912 allows for user input and/or notification. For example, the I/O interface 912 can provide for manual mold movement, manual purge, provisioning of resin, start and/or stop. The control or processing circuitry 900 can also include one or more communication interface(s) 915 that can facilitate communications with a user device 918 and/or one or more remotely located server(s) 921. The communication interface(s) 915 can be configured to support, e.g., WiFi, Bluetooth®, Cellular, or other wired and/or wireless communications between devices, either directly or through a network 918 (e.g., the Internet, WAN, LAN, or cellular network). To this end, the user device 921 may comprise, for example, a portable device such as laptop, tablet, smart phone, personal digital assistant, or other computing device. The server(s) 924 can comprise computing devices and data storage.

Executed within the user device 921 are various applications including a molding interface application 927. Execution of the molding interface application 927 allows for communication between the user device 921 and the reaction injection molding machine 100. Status information of the reaction injection molding machine 100 can be provided to a user through a display device 930. The user may also be able to provide commands and other instructions that can be implemented by the reaction injection molding machine 100. The remotely located server(s) 924 can include molding data and/or programs that can be accessed by the reaction injection molding machine 100. In this way, information regarding molds and/or reactant materials can be accessed and/or updated through a centralized data base. The server(s) 924 may also automatically update applications (or application modules) installed in the reactant materials molding machine 100.

The control or processing circuitry 900 can communicate with various sensors 936 distributed about the reaction injection molding machine 100 to obtain information about the operational status of the process. To this end, sensor interfaces can be included in the control or processing circuitry 900 to allow for communication with the sensors 936. Sensors 936 can include, but are not limited to, inlet sensors such as optical detectors and/or physical switches for detecting when mixing nozzle is installed and locked in position. Pressure and/or temperature sensors can also be included for each mold engagement station. Encoders or other position sensors can be used to detect position of the mold parts 805 and 810 during the molding process. Current sensors can also be distributed about the control or processing circuitry 900 to sense and validate clamp and/or pump motor operation, or to validate fan operation. Switches can be provided to sense when the access doors 110 are closed. Reactant material tank sensors can include proximity sensors to detect the presence of installed tanks and level sensors as have been discussed. The control or processing circuitry 900 can also comprise a component identification (ID) interface 939 that facilitates the acquisition of ID information for installed mold parts 805 and 810 and/or reactant materials tanks 125, 130, 135 and 140. For example, the component ID interface 927 can be a radio frequency ID (RFID) interface that can communicate with RFIDs embedded in or affixed to the mold parts and/or reactant materials tanks.

Stored in the memory 906 are both data and several software components that are executable by the processor(s) 903. In particular, stored in the memory 906 and executable by the processor(s) 903 can be various molding applications and/or modules 942 such as, e.g., a molding process application, a mold identification module, a reactant materials identification module, and/or other applications and/or modules. Also stored in the memory 906 may be a data store 945 and other data (e.g., mold and/or resin information). In addition, an operating system 948 may be stored in the memory 906 and executable by the processor(s) 903.

It is understood that there may be other applications that are stored in the memory 906 and are executable by the processor(s) 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 906 and are executable by the processor(s) 903. In this respect, the term "executable" means a program file that is in a form that can ultimately be run by the processor(s) 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the molding application(s) and/or module(s) 942, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the molding application(s) and/o module(s) 429, and/or other application(s), that comprise software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Figure 10:
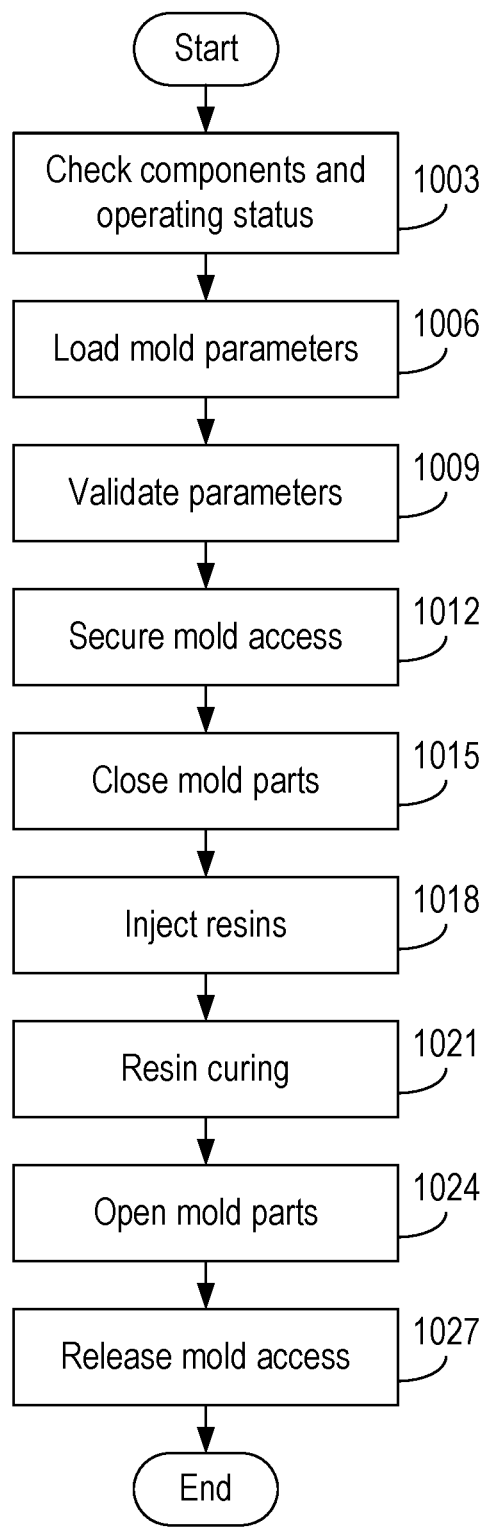
FIG. 10 is a flow diagram illustrating an example of the operation of the reaction injection molding machine of FIGS. 1-7, in accordance with various aspects of the present disclosure.

Referring now to FIG. 10, shown in a flow diagram illustrating an example of the operation of the reaction injection molding machine 100. Operation of the reaction injection molding machine 100 can start by, e.g., pressing a start "button" on the I/O interface 912 (see FIG. 9). This can initiate execution of one or more molding applications and/or modules 492 that can cause the control or processing circuitry to begin a molding process. At 1003, the control or processing circuitry 900 can initially check the components and operating status of the reaction injection molding machine 100. For example, the presence of reactant materials tanks 125, 130, 135 and/or 140 (see FIG. 5) can be check using optical or other proximity sensors. The resins present in the reactant materials tanks can be determined using the component ID interface 939 (see FIG. 9) to obtain the identification information for each installed tank. The mold parts 805 and 810 installed in the reaction injection molding machine 100 can also be determined using the component ID interface 939 to read their RFIDs. Temperature of the first and second reactant materials fluid streams can also be checked using, e.g., resistance temperature detectors (RTDs) in the engagement stations 525 and 540.

Based on the obtained information, the current installation can be determined and the mold parameters loaded at 1006. Parameter information for previously used mold (or known) parts 805 and 810 can be obtained from the data store 945 (see FIG. 9) or parameter information for new mold (or unknown) parts 850 and 810 can be obtained from remotely located server(s) 924 through the communication interface 915 (see FIG. 9). The parameters can be validated at 1009 to ensure that the mold parts 805 and 810 match and the resin in the installed reactant materials tanks 125-140 is compatible with the mold parts. If compatibility is confirmed, the doors 110 (see FIG. 1) are confirmed closed through proximity sensors and locked at 1012 to prevent access during the molding cycle.

With the doors 110 secured, the mold parts 805 and 810 can be run together or closed at 1015 as described with respect to FIGS. 8A-8C. The control or processing circuitry can control the stepper motors 435, 440, 445, and 450 (see FIG. 4) to ensure that corners of the mold engagement plate 315 are driven to align the mold parts appropriately. The speed control can ensure fast operation and a high clamping force for the assembled mold 820 (see FIG. 8C). With the mold parts 805 and 810 clamped together, and the injection molding nozzle 775 inserted through mold engagement plate 330 into the assembled mold 820 (see FIG. 8C), resin can be pumped (or injected) into the mold cavity at 1018 based on the mold parameters. The pressure and volume of each reactant material can be monitored and controlled by the control or processing circuitry. After the injection is completed, the assembled mold 802 remains clamped together for resin curing at 1021. The time period for curing is based on the mold parameters. At the end of the curing time, the mold parts 805 and 810 are opened (or separated) at 1024 as described above with respect to FIGS. 8C and 8D. As the mold engagement plate 315 is pulled away, the force provided by the springs 815 helps to separate the injection molding nozzle 775 from the formed part 825 (see FIG. 8D). When the mold engagement plate 315 has returned to its retracted position, then the doors 110 can be released at 1027 to allow access to the mold parts 805 and 810 and the molded part 825.

Although the flow diagram of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. Further, in some embodiments, one or more of the blocks shown in FIG. 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Aspects of the present disclosure include, but are not limited to, a reaction injection molding machine comprising: a housing comprising an interior portion and exterior portion; at least one reactant materials tank engagement station in operational engagement with at least one reactant material tank comprising part A of an injection molding process and at least one reactant material tank comprising part B of the injection molding process, wherein the reactant materials tanks are each, independently, configured to sealingly engage with a corresponding engagement port in operational communication with the at least one engagement station, thereby providing a first reactant materials fluid stream and a second reactant materials fluid stream, wherein each of the reactant materials tanks are configured to hold up to about three gallons each of reactant material, and wherein the reactant material tanks are sized to fit substantially within at least some of the housing of the reaction injection molding machine; a molding support framework comprising a first and a second mold support plate, wherein: the first and second mold support plates are in respective operational engagement with first and second mold engagement plates; and the first engagement plate is configured to securably engage with a first mold part, and the second engagement plate is configured to securably engage with a second mold part to provide an assembled mold suitable for injection molding when the two mold parts are sealingly engaged; an injection molding manifold in operational engagement with each of the first and second reactant material fluid streams; and an injection molding nozzle engagement station configurable for operational engagement of a proximal end of a mixing nozzle with the injection molding manifold and a distal end of the mixing nozzle with the assembled mold.

Another aspect of the present disclosure includes, but is not limited to, a mold for use in a reaction injection molding machine comprising: a first mold part securable to a first mold part engagement plate; a second mold part securable to a second mold part engagement plate, wherein the first and second mold parts are configured to provide a mold for an injection molding process when the first and second mold parts are sealingly assembled, and wherein: either the first or second mold parts incorporate a mixing nozzle insertion point disposed through a surface of the assembled mold part; and either or both of the first or second mold parts incorporates an identification code that is transmittable to a mold identification signal receiver associated with the reaction injection molding machine. The reaction injection molding machine can be configured to not engage in an injection molding operation when the first or second mold parts to not transmit an identification signal that matches a mold authorization code.

Another aspect of the present disclosure includes, but is not limited to, a reactant materials tank for use in a reaction injection molding machine comprising: a housing having an interior and an exterior, wherein the housing: is formed a material that is substantially impervious to reactant materials used in a reaction injection molding process; is configured to sealingly engage with an engagement station of the reaction injection molding machine; and is configured to provide a holding capacity of up to about 3 gallons of either the first or second reactant materials.

Another aspect of the present disclosure includes, but is not limited to, a reactant materials tank for use in a reaction injection molding machine comprising: a housing having an interior and an exterior, wherein the housing: is formed a material that is substantially impervious to reactant materials used in a reaction injection molding process; and is configured to: incorporate information about the origin and status the tank and to transmit an authorization signal when the tank has been authorized for use; sealingly engage with an engagement station of the reaction injection molding machine; and not to operate when the reactant materials tank does not transmit an authorization when the tank is engaged in the engagement station.

Another aspect of the present disclosure includes, but is not limited to, a method of disengaging a fabricated mold part from a used injection molding nozzle comprising: providing a mixing nozzle comprising partially cured injection molding resin incorporated therein; providing a mold part at least partially connected to a distal end of the mixing nozzle via a sprue, wherein: the mold part is engaged with a mold support plate exterior surface; and the mold support plate is in operational engagement with at least one spring that is secured to a mold support plate interior surface; and applying a force to the spring, thereby generating a spring force suitable to sever the sprue, thereby separating the fabricated mold part from the mixing nozzle.

As described above, the exemplary embodiments have been described and illustrated in the drawings and the specification. The exemplary embodiments were chosen and described in order to explain certain principles of the disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

Therefore, at least the following is claimed:
1. A reaction injection molding machine comprising:
 a. a housing comprising an interior portion and an exterior portion;
 b. at least one reactant materials tank engagement station in operational engagement with a first reactant material tank comprising part A of an injection molding process and a second reactant material tank comprising part B of the injection molding process, wherein the first and second reactant material tanks are each, independently, configured to sealingly engage with a corresponding engagement port in operational communication with the at least one reactant materials tank engagement station, thereby providing a first reactant material fluid stream and a second reactant material fluid stream, wherein each of the first and second reactant material tanks are configured to hold up to about three gallons each of reactant material, and wherein the first and second reactant material tanks are sized to fit substantially within at least some of the housing of the reaction injection molding machine;
 c. a molding support framework comprising a first mold support plate and a second mold support plate, wherein:
  i. the first and second mold support plates are in respective operational engagement with first and second mold engagement plates;
  ii. the first mold engagement plate is configured to securably engage with a first mold part, and the second mold engagement plate is configured to securably engage with a second mold part to provide an assembled mold suitable for injection molding when the first and second mold parts are sealingly engaged; and iii. the molding support framework:
1. is configured to move the second mold engagement plate to clamp the second mold part against the first mold part, thereby forming the assembled mold; and
2. comprises a spring release assembly configured to apply force to the first mold engagement plate opposite the first mold part, where the applied force facilitates disengagement of a distal end of a mixing nozzle from the assembled mold;
d. an injection molding manifold in operational engagement with each of the first and second reactant material fluid streams; and
e. an injection molding nozzle engagement station configurable for operational engagement of a proximal end of the mixing nozzle with the injection molding manifold and the distal end of the mixing nozzle with the assembled mold.

2. The reaction injection molding machine of claim 1, a configured to apply a pressure to the assembled mold during the injection molding process that does not exceed about 500 psi.

3. The reaction injection molding machine of claim 1, wherein the first and second reactant material tanks each, independently, comprise a reactant material to generate at least one thermoset plastic article or part from the injection molding process.

4. The reaction injection molding machine of claim 1, wherein the spring release assembly comprises a plurality of springs operationally engaged with the first mold engagement plate and the first mold support plate.

5. The reaction injection molding machine of claim 1, wherein the mixing nozzle extends through the first mold engagement plate and the first mold support plate for operational engagement of the distal end of the mixing nozzle with the assembled mold.

6. The reaction injection molding machine of claim 1, wherein the molding support framework comprises a linear drive system configured to move the second mold engagement plate to clamp the second mold part against the first mold part.

7. The reaction injection molding machine of claim 6, wherein the linear drive system comprises a plurality of motor driven lead screws supported between the first and second mold support plates, the plurality of lead screws in threaded engagement with the second mold engagement plate.

8. The reaction injection molding machine of claim 1, wherein the at least one reactant materials tank engagement station comprises a pump configured to provide at least the first reactant material fluid stream to the injection molding manifold.

9. The reaction injection molding machine of claim 1, wherein at least one mold part of the first and second mold parts incorporates a mold identification that is transmittable to an identification signal receiver associated with the reaction injection molding machine.

10. The reaction injection molding machine of claim 9, wherein the mold identification comprises a radio-frequency identification (RFID) tag incorporated into the at least one mold part, the RFID tag configured to transmit an identification signal associated with the mold identification for the at least one mold part.

11. The reaction injection molding machine of claim 1, wherein the first and second reactant material tanks incorporate tank identifications that are transmittable to an identification signal receiver associated with the reaction injection molding machine.

12. The reaction injection molding machine of claim 11, wherein the tank identifications comprise radio-frequency identification (RFID) tags incorporated into the first and second reactant material tanks, the RFID tags configured to transmit an identification signal associated with the tank identification, the tank identification corresponding to the reactant material in that reactant material tank.

13. The reaction injection molding machine of claim 11, wherein provision of the first reactant material fluid stream and the second reactant material fluid stream is restricted until the tank identifications have been verified by the reaction injection molding machine.

14. The reaction injection molding machine of claim 1, wherein the corresponding engagement ports comprise a check valve configured to provide a substantially leak proof seal between the first or second reactant material tank engaged with that corresponding engagement port and the at least one reactant materials tank engagement station.

15. The reaction injection molding machine of claim 13, wherein a spring loaded latch mechanism securely engages the first or second reactant material tank with the corresponding engagement port.

16. The reaction injection molding machine of claim 1, wherein the first and second reactant material tanks comprise a fill level indicator configured to provide an indication of reactant material in that reactant material tank.

17. The reaction injection molding machine of claim 16, wherein the fill level indicator comprises a magnetic float incorporated into that reactant material tank.

18. The reaction injection molding machine of claim 1, wherein the part A is a catalyst material and the part B is a polyurethane reactant material or a coreactive silicon or epoxy material.

19. The reaction injection molding machine of claim 18, wherein the catalyst material is a formulated polymeric isocyanate catalyst and the polyurethane reactant material is a formulated polyol blend.

20. The reaction injection molding machine of claim 1, wherein the first and second mold parts are generated using a 3D printing process.

21. The reaction injection molding machine of claim 1, wherein the at least one reactant materials tank engagement station comprises a key-way for each corresponding engagement port, the key-way comprising features configured to align with corresponding features of either the first or second reactant material tank containing the appropriate first or second reactant material for that corresponding engagement port.

* * * * *